United States Patent
Parian

(10) Patent No.: US 12,254,642 B2
(45) Date of Patent: Mar. 18, 2025

(54) AUTOMATIC REGISTRATION OF MULTIPLE MEASUREMENT DEVICES

(71) Applicant: FARO Technologies, Inc., Lake Mary, FL (US)

(72) Inventor: Jafar Amiri Parian, Schlieren (CH)

( * ) Notice: Subject to any disclaimer, the term of this patent is extended or adjusted under 35 U.S.C. 154(b) by 357 days.

(21) Appl. No.: 17/511,648

(22) Filed: Oct. 27, 2021

(65) Prior Publication Data

US 2022/0207759 A1     Jun. 30, 2022

Related U.S. Application Data

(60) Provisional application No. 63/131,594, filed on Dec. 29, 2020.

(51) Int. Cl.
| | |
|---|---|
| *G06T 7/33* | (2017.01) |
| *G06T 7/73* | (2017.01) |
| *G06V 10/24* | (2022.01) |

(52) U.S. Cl.
CPC ............... *G06T 7/337* (2017.01); *G06T 7/74* (2017.01); *G06V 10/24* (2022.01); *G06T 2207/10028* (2013.01)

(58) Field of Classification Search
CPC . G06T 7/337; G06T 7/74; G06T 2207/10028; G06T 2207/10004; G06T 7/73; G06T 7/33; G06V 10/24
See application file for complete search history.

(56) References Cited

U.S. PATENT DOCUMENTS

| | | |
|---|---|---|
| 7,583,375 B2 | 9/2009 | Cramer et al. |
| 8,537,376 B2 | 9/2013 | Brown et al. |
| 8,558,992 B2 | 10/2013 | Steffey |

(Continued)

FOREIGN PATENT DOCUMENTS

| | | |
|---|---|---|
| EP | 3382337 A | 10/2018 |
| WO | 2013029675 A1 | 3/2013 |
| WO | 2019046962 A1 | 3/2019 |

OTHER PUBLICATIONS

European Search Report; Issued: Jun. 7, 2022; Application No. 21213659.2; Filed: Dec. 10, 2021; 11 pages.

(Continued)

*Primary Examiner* — Wassim Mahrouka
(74) *Attorney, Agent, or Firm* — McCarter & English, LLP; Dave S. Christensen

(57) ABSTRACT

A computer-implemented method is performed by one or more processors to automatically register a plurality of captured data obtained using a respective measurement device, each of the captured data is obtained separately. The computer-implemented method includes accessing a first captured data of a portion of an environment, and a first image corresponding to said portion of the environment captured from a known relative position and angle with respect to the first captured data. Further, from the plurality of captured data, a second captured data is identified that has at least a partial overlap with said portion, the second captured data is identified based on a corresponding second image. The second image is captured from a known relative position and angle with respect to the second captured data. The method further includes transforming the second captured data and/or the first captured data to a coordinate system.

20 Claims, 22 Drawing Sheets

(56) References Cited

U.S. PATENT DOCUMENTS

| | | | |
|---|---|---|---|
| 8,705,012 B2 | 4/2014 | Greiner et al. | |
| 8,724,120 B2 | 5/2014 | Steffey et al. | |
| 9,163,922 B2 | 10/2015 | Bridges et al. | |
| 9,671,221 B2 | 6/2017 | Ruhland et al. | |
| 9,693,040 B2 | 6/2017 | Hillebrand et al. | |
| 10,598,479 B2 | 3/2020 | Becker et al. | |
| 10,782,118 B2 | 9/2020 | Hillebrand | |
| 10,824,773 B2 | 11/2020 | Santos et al. | |
| 10,841,562 B2 | 11/2020 | Heidemann et al. | |
| 10,907,955 B2 | 2/2021 | Armstrong et al. | |
| 10,989,532 B2 | 4/2021 | Buback et al. | |
| 11,080,870 B2 | 8/2021 | Flohr | |
| 2008/0170777 A1* | 7/2008 | Sullivan | G06T 7/33 345/475 |
| 2014/0293016 A1* | 10/2014 | Benhimane | G06T 7/246 348/50 |
| 2017/0094251 A1 | 3/2017 | Wolke et al. | |
| 2019/0222826 A1* | 7/2019 | Millett | H04N 13/271 |
| 2019/0325604 A1* | 10/2019 | Fink | G06T 19/006 |
| 2020/0050727 A1 | 2/2020 | Zweigle et al. | |
| 2020/0292297 A1 | 9/2020 | Atala et al. | |
| 2021/0082148 A1* | 3/2021 | Parkison | G01S 7/40 |
| 2021/0295606 A1* | 9/2021 | Kim | G06T 17/20 |
| 2022/0051422 A1 | 2/2022 | Parian | |
| 2022/0130112 A1 | 4/2022 | Ossig et al. | |
| 2022/0138157 A1 | 5/2022 | Zweigle et al. | |

OTHER PUBLICATIONS

Feng et al., "Visual Map Construction Using RGB-D Sensors for Image-Based Localization in Indoor Environments," Journal of Sensors, vol. 2017, Article ID 8037607, Jan. 1, 2017, 19 pages.

Li et al., "3D Reconstruction of Indoor Scenes via Image Registration," Neural Processing Letters, vol. 48, No. 3, Mar. 26, 2018, pp. 1281-1304.

European Office Action for Application No. 21213659.2, dated Jan. 3, 2025, 6 pages.

* cited by examiner

| Type of captured data | Measurement Device Identifier | Data Structure | Timestamp | Identifier Image | Fingerprint |
|---|---|---|---|---|---|
| | | | | | |
| | | | | | |
| | | | | | |

FIG. 3

AUTOMATIC REGISTRATION OF MULTIPLE MEASUREMENT DEVICES

CROSS REFERENCE TO RELATED APPLICATIONS

This application claims the benefit of U.S. Provisional Application Ser. No. 63/131,594, filed Dec. 29, 2020, the entire disclosure of which is incorporated herein by reference.

BACKGROUND

The subject matter disclosed herein relates to use of a measurement devices, such as laser scanners, and performing automatic registration of data captured by multiple such measurement devices.

Various applications such as facility management, forensic/crime scene investigation, accident reconstruction, architectural/civil engineering, and heritage documentation/restoration, use various types of measurement devices such as two-dimensional (2D), and three-dimensional (3D) laser scanners. For example, volume scanners are used to capture measurements of entire environments, such as crime scenes, building facades, or complex piping and wiring, and various other such cumbersome tasks. Measurement devices provide an economical way of capturing and analyzing millions (or more) of 3D data points in the environment to facilitate generating detailed 2D and/or 3D images of complex environments and geometries. In addition, measurement devices such as 3D images facilitate performing inspections and verify assemblies of products in an industrial setting accurately, and at relatively lesser cost. Measurement devices also include laser trackers that perform precise coordinate measuring that can facilitate industrial operations such as alignment, installation, part inspection, and other types of manufacturing and assembly integration projects.

While existing measurement devices are suitable for their intended purposes, what is needed is a system having certain features of embodiments of the present disclosure.

BRIEF DESCRIPTION

According to one or more embodiments, a system includes one or more processors that automatically register a plurality of captured data, each of the scanned data is captured separately. A method for the registering includes accessing a first captured data of a portion of an environment, and a first image corresponding to the first captured data, the first image is of said portion of the environment captured from a known relative position and angle with respect to the first captured data. The method further includes extracting a set of features from the first image. The method further includes identifying, from the plurality of captured data, a second captured data that has at least a partial overlap with said portion, the second captured data is identified based on a corresponding second image including a subset of features from the set of features that is extracted from the first image, the second image is captured from a known relative position and angle with respect to the second captured data. The method further includes determining a pose and angle of the first image with respect to the second image by aligning the first image to the second image by using the subset of features that are in both, the first image and the second image. The method further includes transforming the second captured data and/or the first captured data to a coordinate system based on known the computed pose and angle and relative positions and angles of the first image and the second image and the first captured data and the second captured data, respectively.

In one or more embodiments, the first image is captured at the time the first captured data is obtained. In one or more embodiments, the first captured data and the second captured data are obtained at different times.

In one or more embodiments, the first captured data and the second captured data are captured using different types of measurement devices. In one or more embodiments, the first image and the second image are captured using different image capturing devices.

In one or more embodiments, the first captured data comprises a 3D point cloud of said portion, and the second captured data comprises a 2D scan of said portion.

In one or more embodiments, the set of features comprises one or more natural features that are detected in said portion.

In one or more embodiments, the set of features comprises one or more artificial markers that are detected in said portion.

In one or more embodiments, the first image and the second image are each captured using a respective wide-angle lens.

In one or more embodiments, the coordinate system is that of the first captured data.

In one or more embodiments, the plurality of captured data is stored in a database.

In one or more embodiments, the pose and angle of the second captured data is determined further based on one or more sensor measurements associated with a measurement device that is used to capture the second captured data.

According to an embodiment, a computer-implemented method is performed by one or more processors to automatically register a plurality of captured data obtained using a respective measurement device, each of the captured data is obtained separately. The computer-implemented method includes accessing a first captured data of a portion of an environment, and a first image corresponding to the first captured data, the first image is of said portion of the environment captured from a known relative position and angle with respect to the first captured data. The method further includes extracting a set of features from the first image. The method further includes identifying, from the plurality of captured data, a second captured data that has at least a partial overlap with said portion, the second captured data is identified based on a corresponding second image including a subset of features from the set of features that is extracted from the first image, the second image is captured from a known relative position and angle with respect to the second captured data. The method further includes determining a pose and angle of the first image with respect to the second image by aligning the first image to the second image by using the subset of features that are in both, the first image and the second image. The method further includes transforming the second captured data and/or the first captured data to a coordinate system based on known the computed pose and angle and relative positions and angles of the first image and the second image and the first captured data and the second captured data, respectively.

Embodiments of the technical solutions described herein can include devices, apparatus, computer program products, and any other implementation of a machine, process, or a combination thereof.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 depicts an example data structure to store the captured data and the corresponding image according to one or more embodiments;

Figure 1:
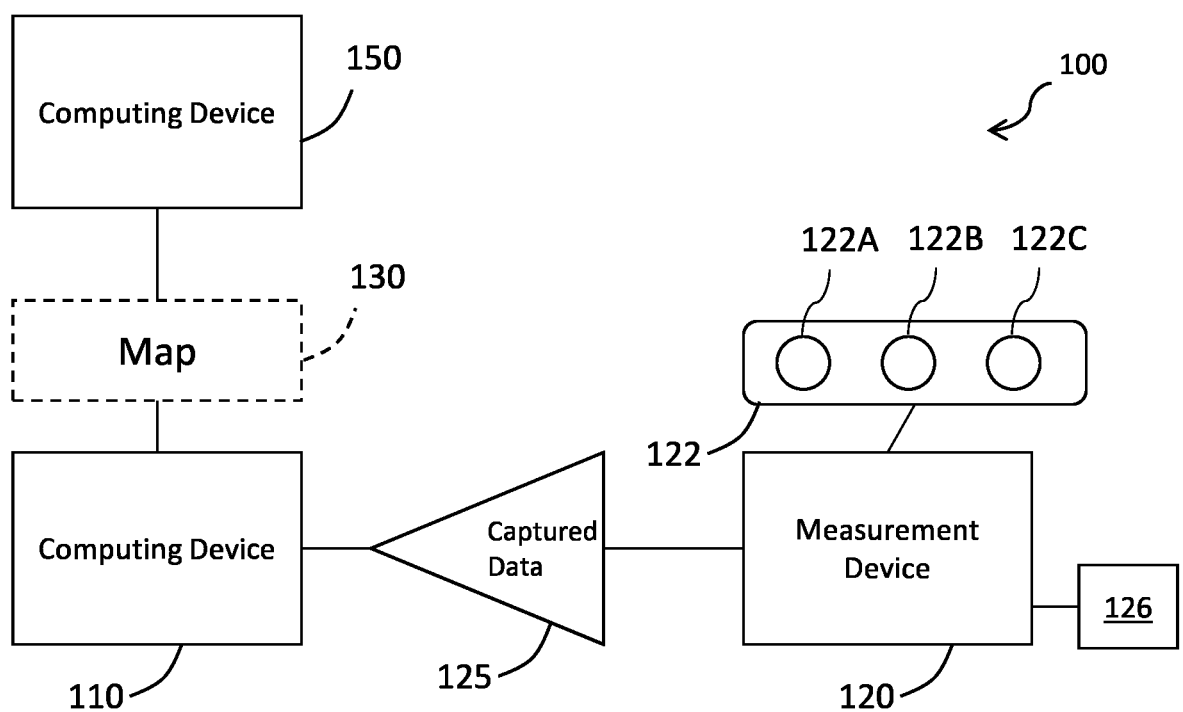
FIG. 1 depicts a system for capturing measurements in an environment according to one or more embodiments.

The detailed description explains embodiments of the invention, together with advantages and features, by way of example with reference to the drawings.

DETAILED DESCRIPTION

Embodiments herein relate to automated linking or registering of data captured by a measuring device with existing data that has already been captured by the same measuring device, or another measuring device. For example, while the present data may be captured by a laser scanner, the existing data can include data captured using any other measuring device such as, a laser tracker, FARO® FREESTYLE®, FARO® SCANPLAN®, articulated arm, or any other type of measuring device. The existing data may have been captured at a different time. For example, the existing data can be older by a day, a week, a month, a year, or any other duration. The present data and the existing data can be stored in a cloud platform, such as using a distributed storage system, although any other storage architecture can be used without affecting the features of the technical solutions described herein.

Embodiments of the technical solutions described herein facilitate using the captured data from these varied data sources, i.e., measurement devices, together. Embodiments of the technical solutions described herein facilitate determining the captured data that are to be registered together, and proceeding with such registering so that a user can obtain a holistic view of the environment, and at least the portion for which data was captured. Such processing, including determining the relevant captured data and their registration is performed automatically. There are several technical challenges with using the data from such varied data sources together.

The technical challenges include identifying which two (or more) captured data are relevant for registering. The technical challenges further include that the captured data can be in different coordinate systems of the respective data sources. That is because the pose, i.e., position and orientation, of the respective measurement device can be different at the time of data capture. Embodiments of the technical solutions described herein address such technical challenges using images of the portions for which data is captured. The images can be captured by cameras associated with the measuring devices, for example, color cameras and/or infrared cameras. The cameras can use wide-angle or ultrawide-angle lenses in one or more embodiments. The cameras that capture the images can be internal to the measurement devices and/or external to the measurement devices.

Embodiments of the present disclosure provide technical solutions to technical challenges in coordinate measurement devices. The measurement devices can capture two-dimensional or three-dimensional (3D) scans or measurements. Such measurements/scans can include 3D coordinates, 2D maps, 3D point clouds, or a combination thereof. The measurements/scans can include additional components, such as annotations, images, textures, measurements, and other details.

Figure 12:
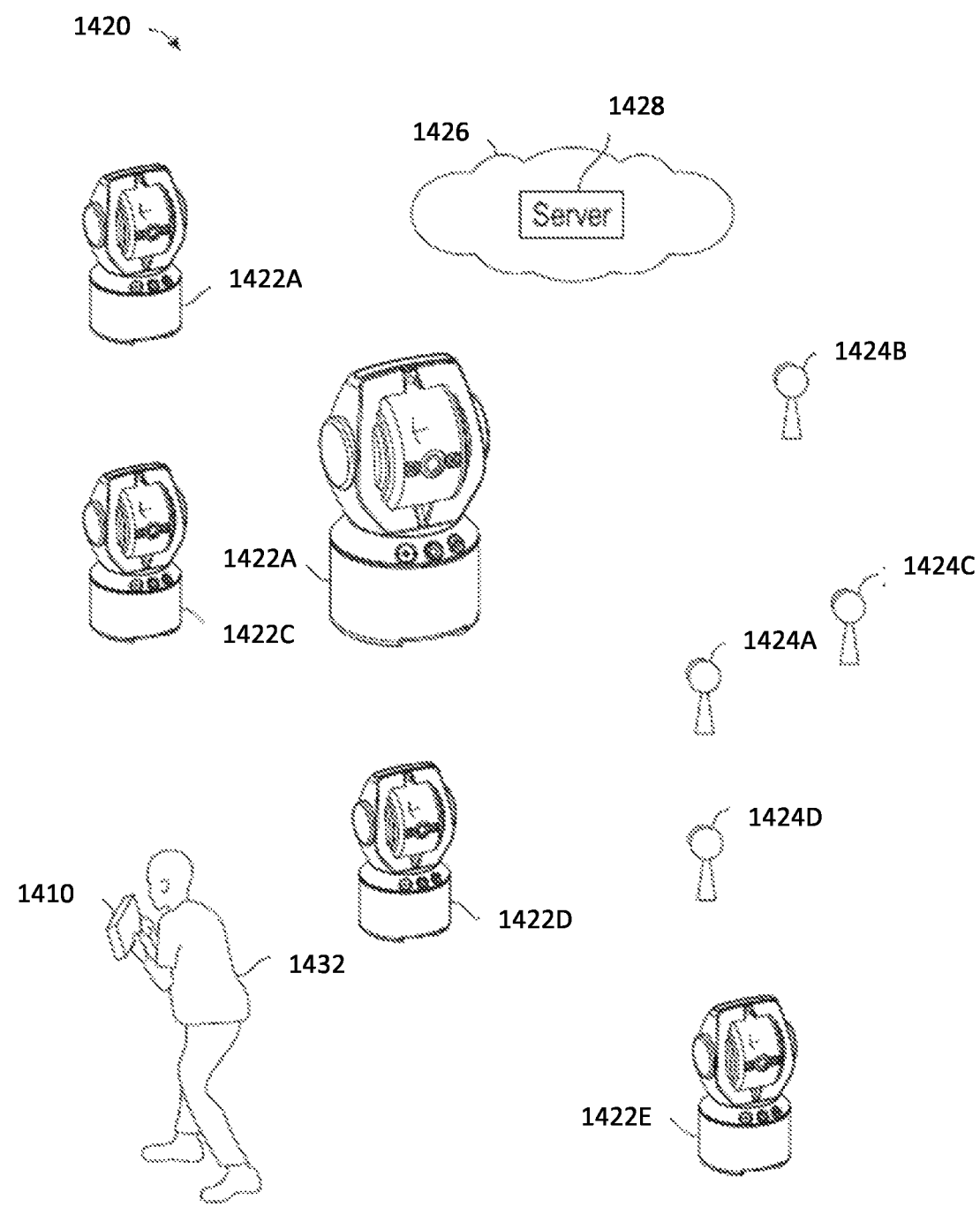
FIGS. 12-14 depict an embodiment of a laser tracker device.

A laser tracker device is a metrology device that measures positional coordinates using laser light. Laser tracker devices of the type discussed herein may be used in manufacturing environments where it is desired to measure objects, parts, or assemblies with a high level of accuracy. It should be appreciated in some applications, multiple laser tracker devices may be used and may be positioned in locations that are distant from an operator. An exemplary embodiment of a laser tracker system 20 is provided that allows an operator or user to control and operate the functions of a desired laser tracker device is illustrated in FIG. 12 (described later herein).

The laser tracker system 1420 includes at least one laser tracker device 1422A, and may include a plurality of laser tracker devices 1422B-1422E. The system 1420 further includes at least one retroreflective target 1424A, and may include a plurality of retroreflective targets 1424B-1424D. As will be discussed in more detail herein, the retroreflective targets 1424A-1424D cooperate with laser light emitted by the laser tracker devices 1422A-1422E to allow a laser tracker device to measure the distance between the laser tracker device and the retroreflective target. With the distance to the retroreflective device determined, angular measurement devices, such as angular encoders for example, in the laser tracker device allow for the determination of the coordinates of the retroreflective device in a laser tracker device frame of reference.

The system 1420 further includes a computer network 1426 that may include one or more nodes 1428, such as a computer server for example. The computer network 1426 may be any known computer network, such as but not limited to a local area network (LAN), a wide-area network (WAN), a cellular network or the Internet for example. In an embodiment, each of the laser tracker devices includes communications circuits, such as Ethernet (IEEE 802.3), WiFi (IEEE 802.11) or cellular communications circuits for example, that are configured to transmit to and receive signals from the computer network 1426. The system 1420 further includes at least one mobile computing device 30. As will be discussed in more detail herein, the mobile computing device 30 includes communications circuits that allow the mobile computing device 30 to transmit to and receive signals from the computer network. As will be discussed in more detail herein, the computer network 1426 allows the mobile computing device 30 to transmit signals to and receive signals from one or more of the laser tracker devices 1422A-1422E.

As used herein, the term "mobile computing device" refers to a computing device having one or more processors, a display, and non-transitory memory that includes computer readable instructions. The mobile computing device also includes a power source, such as a battery for example, that allows a user to move about the environment with the mobile computing device. The mobile computing device is sized and shaped to be carried by a single person. In an embodiment, the mobile computing device may be but is not limited to a cellular phone, a smartphone, a personal digital assistant, a tablet computer, a laptop computer or a convertible laptop computer for example.

Other types of coordinate measurement devices measure an area as opposed to discrete points, as is done in the laser tracker of FIG. 12. Because coordinate points for an area are being measured simultaneously, this measurement process is sometimes referred to as a "scan." Typically, when capturing a scan of an environment, a version of the simultaneous localization and mapping (SLAM) algorithm is used. For completing such scans a scanner, such as the FARO® SCANPLAN®, FARO® SWIFT®, FARO® FREE-STYLE®, or any other measurement system incrementally builds the scan of the environment, while the scanner is moving through the environment, and simultaneously the scanner tries to localize itself on this scan that is being generated. An example of a handheld scanner is described in U.S. patent application Ser. No. 15/713,931, the contents of which is incorporated by reference herein in its entirety. This type of scanner may also be combined with a another scanner, such as a time of flight scanner as is described in commonly owned U.S. patent application Ser. No. 16/567,575, the contents of which are incorporated by reference herein in its entirety. It should be noted that the scanners listed above are just examples of measurement devices and that the type of scanner used in one or more embodiments does not limit the features of the technical solutions described herein.

FIG. 1 depicts a system for capturing measurements in an environment according to one or more embodiments. The measurement system 100 includes a computing system 110 coupled with a measurement device 120. The coupling facilitates wired and/or wireless communication between the computing system 110 and the measurement device 120. The measurement device 120 can include a laser tracker, a 2D scanner, a 3D scanner, or any other measurement device or a combination thereof. The captured data 125 from the measurement device 120 includes measurements of a portion from the environment. The captured data 125 is transmitted to the computing system 110 for storage. The computing device 110 can store the captured data 125 locally, i.e., in a storage device in the computing device 110 itself, or remotely, i.e., in a storage device that is part of another computing device 150. The computing device 150 can be a computer server, or any other type of computing device that facilitates remote storage and processing of the captured data 125.

In one or more embodiments, the captured data 125 can be used to generate a map 130 of the environment in which the measurement device 120 is being moved. The computing device 110 and/or the computing device 150 can generate the map 130. The map 130 can be generated by combining several instances of the captured data 125, for example, submaps. Each submap can be generated using SLAM, which includes generating one or more submaps corresponding to one or more portions of the environment. The submaps are generated using the one or more sets of measurements from the sets of sensors 122. The submaps are further combined by the SLAM algorithm to generate the map 130.

The captured data 125 can include one or more point clouds, distance of each point in the point cloud(s) from the measurement device 120, color information at each point, radiance information at each point, and other such sensor data captured by the set of sensors 122 that is equipped on the measurement device 120. For example, the sensors 122 can include a LIDAR 122A, a depth camera 122B, a camera 122C, etc.

The measurement device 120 can also include an inertial measurement unit (IMU) 126 to keep track of a pose, including a 3D orientation, of the measurement device 120. Alternatively, or in addition, the captured data 125 the pose can be extrapolated by using the sensor data from sensors 122, the IMU 126, and/or from sensors besides the range finders.

It should be noted that a "submap" is a representation of a portion of the environment and that the map 130 of the environment includes several such submaps "stitched" together. Stitching the maps together includes determining one or more landmarks on each submap that is captured and aligning and registering the submaps with each other to generate the map 130. In turn, generating each submap includes combining or stitching one or more sets of captured data 125 from the measurement device 120. Combining two or more captured data 125 requires matching, or registering one or more landmarks in the captured data 125 being combined.

Here, a "landmark" is a feature that can be detected in the captured data 125, and which can be used to register a point from a first captured data 125 with a point from a second captured data 125 being combined. For example, the landmark can facilitate registering a 3D point cloud with another 3D point cloud or to register an image with another image. Here, the registration can be done by detecting the same landmark in the two captured data 125 (images, point clouds, etc.) that are to be registered with each other. A landmark can include, but is not limited to features such as a doorknob, a door, a lamp, a fire extinguisher, or any other such identification mark that is not moved during the scanning of the environment. The landmarks can also include stairs, windows, decorative items (e.g., plant, picture-frame, etc.), furniture, or any other such structural or stationary objects. In addition to such "naturally" occurring features, i.e., features that are already present in the environment being scanned, landmarks can also include "artificial" landmarks that are added by the operator of the measurement device 120. Such artificial landmarks can include identification marks that can be reliably captured and used by the measurement device 120. Examples of artificial landmarks can include predetermined markers, such as labels of known dimensions and patterns, e.g., a checkerboard pattern, a target sign, spheres, or other such preconfigured markers.

In the case of some of the measurement devices 120, such as a volume scanner, the computing device 110, 150 can implement SLAM while building the scan to prevent the measurement device 120 from losing track of where it is by virtue of its motion uncertainty because there is no presence of an existing map of the environment (the map is being generated simultaneously). It should be noted that in the case of some types of the measurement devices 120, SLAM is not performed. For example, in the case of a laser tracker 20, the captured data 125 from the measurement device 120 is stored, without performing SLAM.

Figure 2:
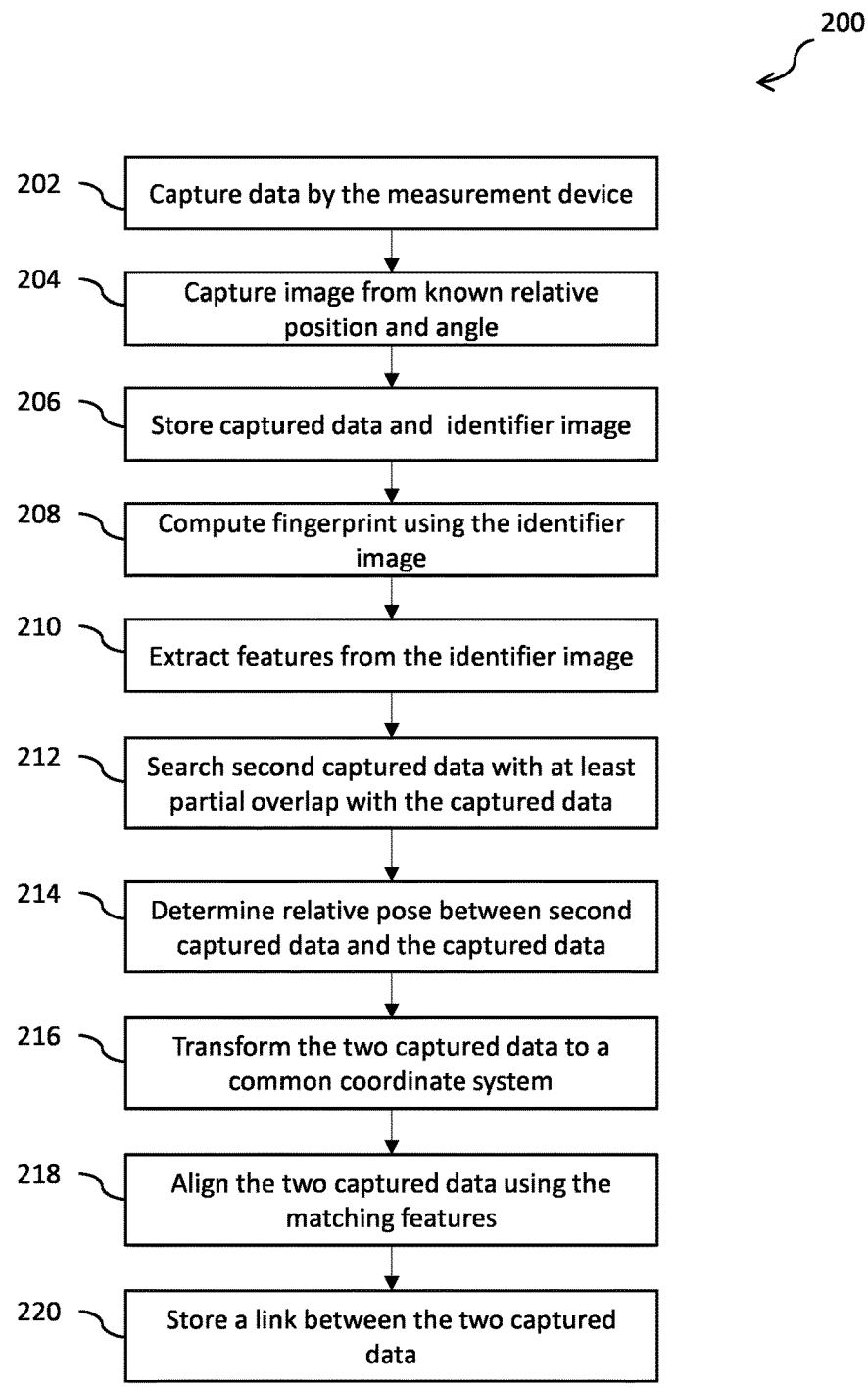
FIG. 2 depicts a flowchart for a method 200 for automatically registering captured data from different data sources, and/or at different times according to one or more embodiments.

FIG. 2 depicts a flowchart for a method 200 for automatically registering captured data from different data sources, and/or at different times according to one or more embodiments. The method 200 includes capturing and storing, by the measurement device 120, the captured data 125 for a portion of the environment, at block 202. The captured data 125 can be a 3D point cloud, a scan, a measurement (e.g., length of wall, dimensions of an object etc.), or any other such data captured by the measuring device 120.

Further, an image is captured by the measurement device 120 from a known relative position and angle with respect to where the captured data 125 is obtained, at block 204. In one or more embodiments, it can be the same position as the first captured data 125. The image can be captured using a wide-angle or ultrawide-angle lens camera. The camera can be the camera 122C that is part of the sensors 122. Alternatively, the camera used for capturing the image can be an external camera attached to the measurement device 120.

FIG. 3 depicts an example data structure to store the captured data and the corresponding image according to one or more embodiments. It should be noted that data structure 300 that is depicted is a table, however, in other embodiments the data structure can use another format, graphs, arrays, etc. The data structure 300 can be stored using a database system in one or more embodiments. Further, it should be noted that in other embodiments, the data structure 300 can include additional columns and rows that that are depicted.

In the depicted data structure 300 includes another data structure 306 that is used to store the captured data 125. The data structure 306 is based on the type of the captured data 302. For example, a first data structure 306 for a first captured data 125 of type 302 "3D point cloud" will be different from a second data structure 306 that is used to store a second captured data 125 of type "laser measurement."

The data structure 300 further stores an identifier 304 of the measurement device 120 that is used to obtain the captured data 125. The identifier 304 can be a name, a serial number, a model number, or any other value that can facilitate identifying the measurement device 120. Further, the data structure 300 includes a timestamp 308 representing when the captured data 125 is obtained.

Further, the data structure 300 includes an identifier image 310 that is captured of the portion for which the captured data 125 is obtained. For example, the first image that is captured in conjunction with the first captured data 125 is stored as the identifier image 310. The identifier image 310 can be an image captured using a wide-angle or ultrawide-angle lens in one or more embodiments. Further, in one or more embodiments, the identifier image 310 is of a predetermined dimension and resolution.

Additionally, in one or more embodiments, the identifier image 310 is converted to a fingerprint 312 of the captured data 125. The fingerprint 312 can be a vectorized data that represents the identifier image 310, for example, a global image features like GIST features. Alternatively, a hash value of the identifier image 310 can be used as the fingerprint 312. Any other technique including parametric and nonparametric can be used to reduce the dimensionality of the identifier image 310 and store the result as the fingerprint 312.

In some embodiments, other sensor measurements of the sensors 122 of the measurement device, such as the pose of the measurement device 120, if available are also stored.

Accordingly, the data structure 300 is used to store the captured data 125 along with its metadata. In FIG. 3, each row represents a captured data 125 and its metadata. The data structure 300 can be used to the store the captured data 125 in the computing device 110 and/or the computing device 150.

Referring to the flowchart, the method 200 further includes storing the captured data 125 and the image as its corresponding identifier image 310 in the data structure 300, at block 206. Further, a fingerprint 312 for the captured data 120 is computed using the identifier image 310, at block 208. The fingerprint 312 can be computed by a representation of low-dimensional image that contains enough information to identify the scene in an image. Such representations are for example, GIST or Convolutional Neural Network (CNN) features. In one or more embodiments, the fingerprint 312 can be based on one or more features that are extracted from the identifier image 310. The feature extraction can be performed using one or more algorithms, such as SIFT/SURF, or any other such algorithms.

In response, an automated registering of the captured data 125 with one or more existing captured data 125 is performed in one or more embodiments. Alternatively, in some embodiments, the automated registration is triggered in response to an operator instructing to initiate such registration.

For the automatic registration, the computing device 110 extracts a set of features from the identifier image 310 of the captured data 125, at block 210. The feature extraction can be performed using known techniques. The features that are extracted are detected based on landmarks or image features. The extracted features can include natural and/or artificial landmarks. For example, image feature extraction algorithms like Harris corner, SIFT/SURF, or any other such algorithms are used to extract one or more features from the identifier image 310. The feature extraction can be performed prior to the fingerprint computation in some embodiments, where the fingerprint 312 is computed based on the features extracted.

Further, at block 212, another captured data 125 that is already stored in the data structure 300 is searched for, such that the other (i.e., second) captured data 125 has at least a partial overlap with the portion that is captured by the first captured data 125. The partial overlap is determined based on a second identifier image 310 of the second captured data 125. In one or more embodiments, extracted features from the first identifier image 310 and the second identifier image 310 are compared. If at least a predetermined number of the extracted features match, the first captured data 125 and the second captured data 125 are considered to have at least a partial overlap.

Alternatively, or in addition, in one or more embodiments, a first fingerprint 312 of the first captured data 125 and a second fingerprint 312 of the second captured data are compared. If the match between the two is at least a predetermined level, the first captured data 125 and the second captured data 125 are considered to have at least a partial overlap. The feature matching is carried out by nearest neighbor search (NN).

If a match satisfying the predetermined threshold is identified, the second captured data 125 that is determined is registered with the first captured data 125 (or vice versa) automatically. The registration includes determining a difference in pose and angle between the second captured data 125 and the first captured data 125, at block 214. The difference in pose and angle can be determined by using the subset of features that are in both, the first identifier image 310 and the second identifier image 310. Alternatively, if the angular information is available in the data structure 300, for example, based on the IMU of the respective measurement devices 120 used, the relative pose can be determined based on such angular information.

Further, at block 216, a transformation is performed so that the first captured data 125 and the second captured data 125 are in a common coordinate system. The common coordinate system can be that of either the first captured data or the second captured data, or a third coordinate system altogether. The transformation changes the coordinates of all the data points in the captured data 125. In one or more embodiments, the transformation is also applied to the first identifier image 310 and the second identifier image 310.

In order to perform such coordinate system transformation, the relative pos and angle of the image which is captured by 122 should be known with respect to the coordinate system of the measurement device 120. This information can be determined by a factory calibration and be known and available later during coordinate system transformation.

At block 218, the first captured data 125 and the second captured data 125 are, after the transformation, aligned based on the matching features from the two captured data 125. Once aligned, the two captured data 125 can be used together.

In one or more examples, the first captured data 125 and the second captured data 125 are captured using different measurement devices 120. For example, if the second captured data 125 includes dimension measurements of one or more objects in the field of view, the dimensions can be shown on a graphical user interface of the computing device 110, or the measurement device 120 overlaying the display of the first captured data 125.

Alternatively, the first captured data 125 can be a 3D point cloud of a portion from a 3D scanner, and the second captured data 125 can be a 2D scan of the same portion from a 2D scanner. The 3D point cloud can be used to display details from the overlapping portion from the 2D scan.

Further, the first captured data 125 and the second captured data 125 can be from different times. For example, the duration between the two captured data 125 can be a few minutes, a day, a week, a month, or any other duration.

Alternatively, if the first captured data 125 and the second captured data 125 are both 3D point clouds, the two captured data 125 can be stitched together. Several other applications of using the two captured data 125 together can be performed.

In one or more embodiments, the method 200 includes storing a link between the two captured data 125, at block 220. The link can include the transformation to align the two captured data 125. The link can be stored in the data structure 300 or in another data structure (not shown). In this manner, when an operator selects a captured data 125 that has other linked captured data 125, the operator can be shown that such linked captured data 125 exist. Further, a list of the linked captured data 125 can be shown to the operator for further examination or analysis if s/he so desires.

The operations in the method 200 can be repeated until a matching data structure 125 is identified in the data structure 300.

Further, various embodiments of different types of measurement devices 120 are shown. It should be noted that the further description of measurement devices 120 is not an exhaustive list and that any other type of measurement device 120 can also be used in implementation of the technical solutions described herein.

Figure 4:
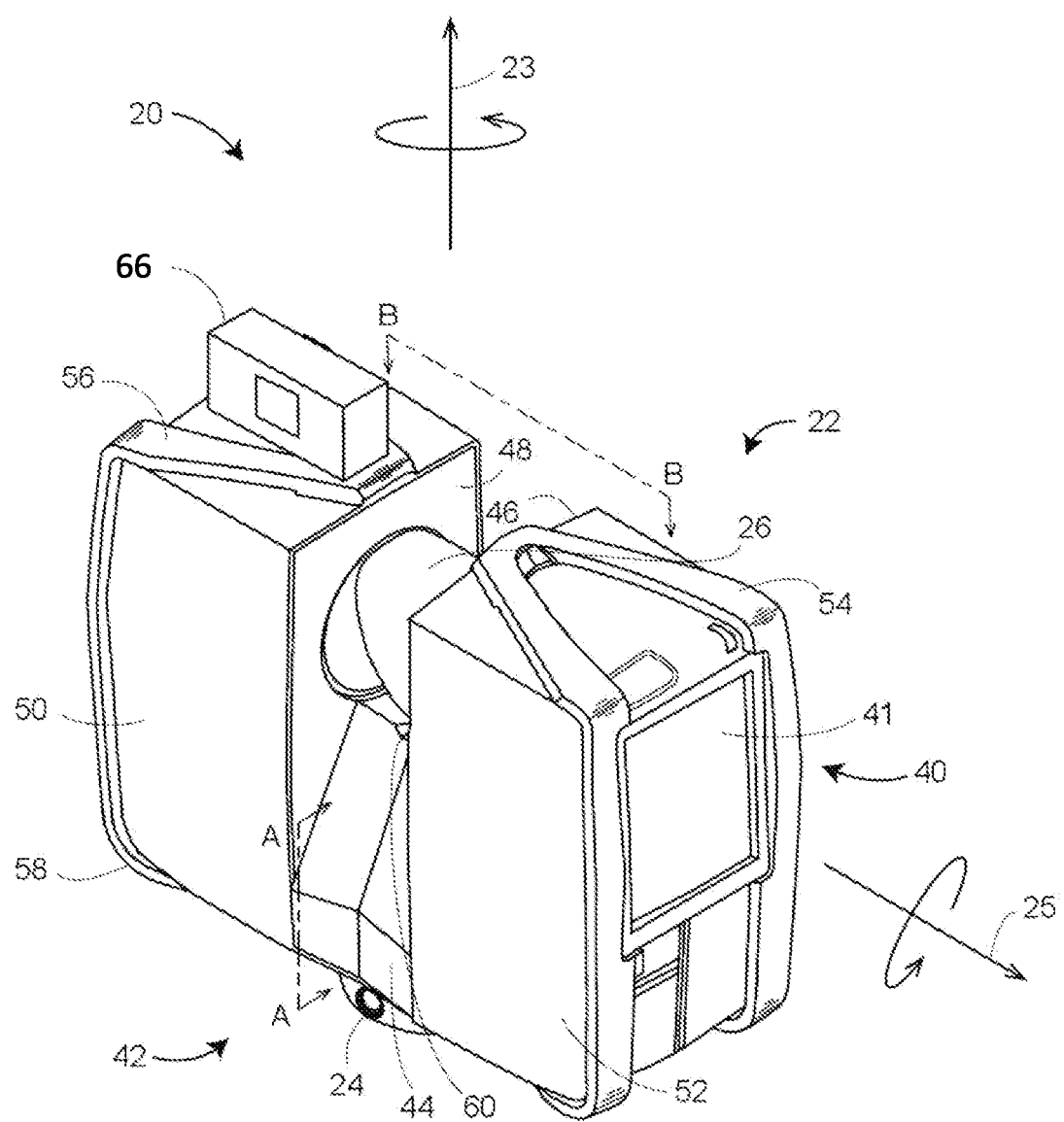
FIGS. 4, 5, and 6 depict a laser scanner for optically scanning and measuring the environment surrounding the laser scanner.
Figure 5:
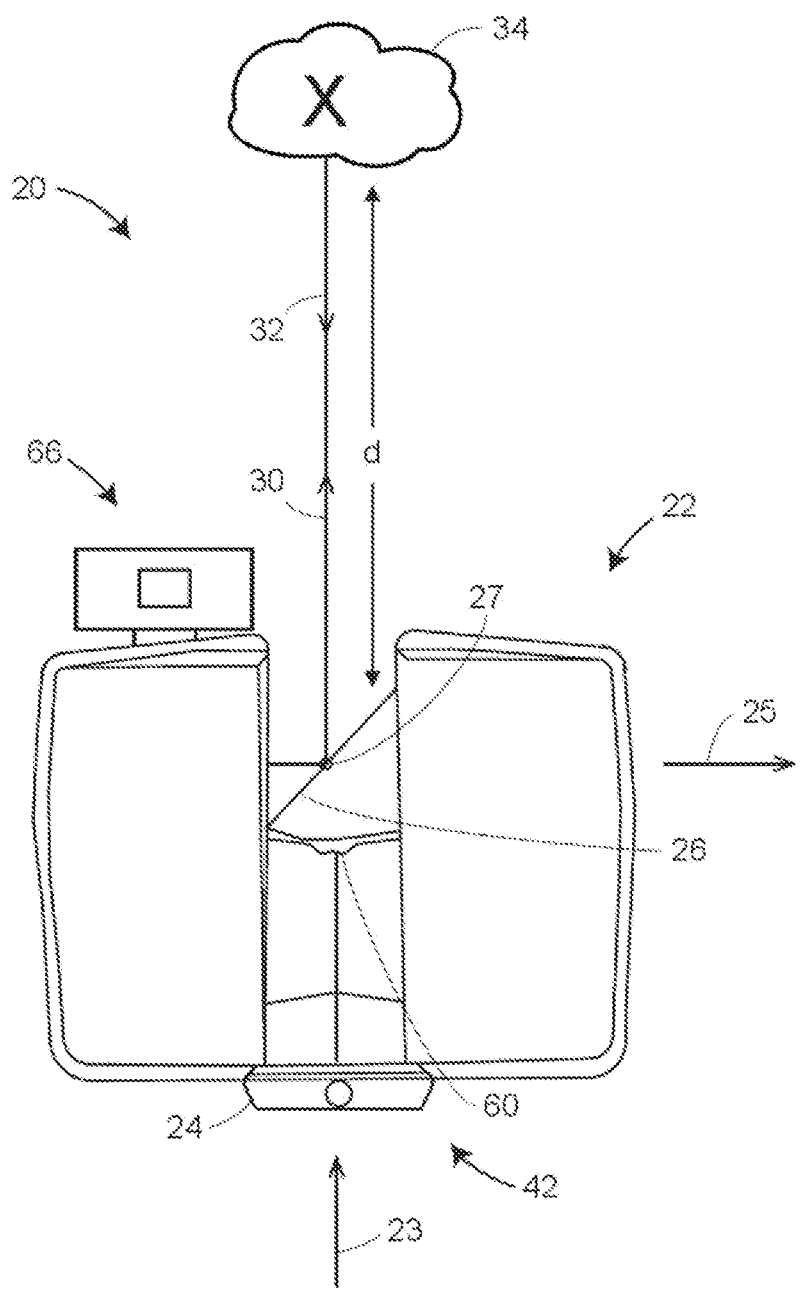
Figure 6:
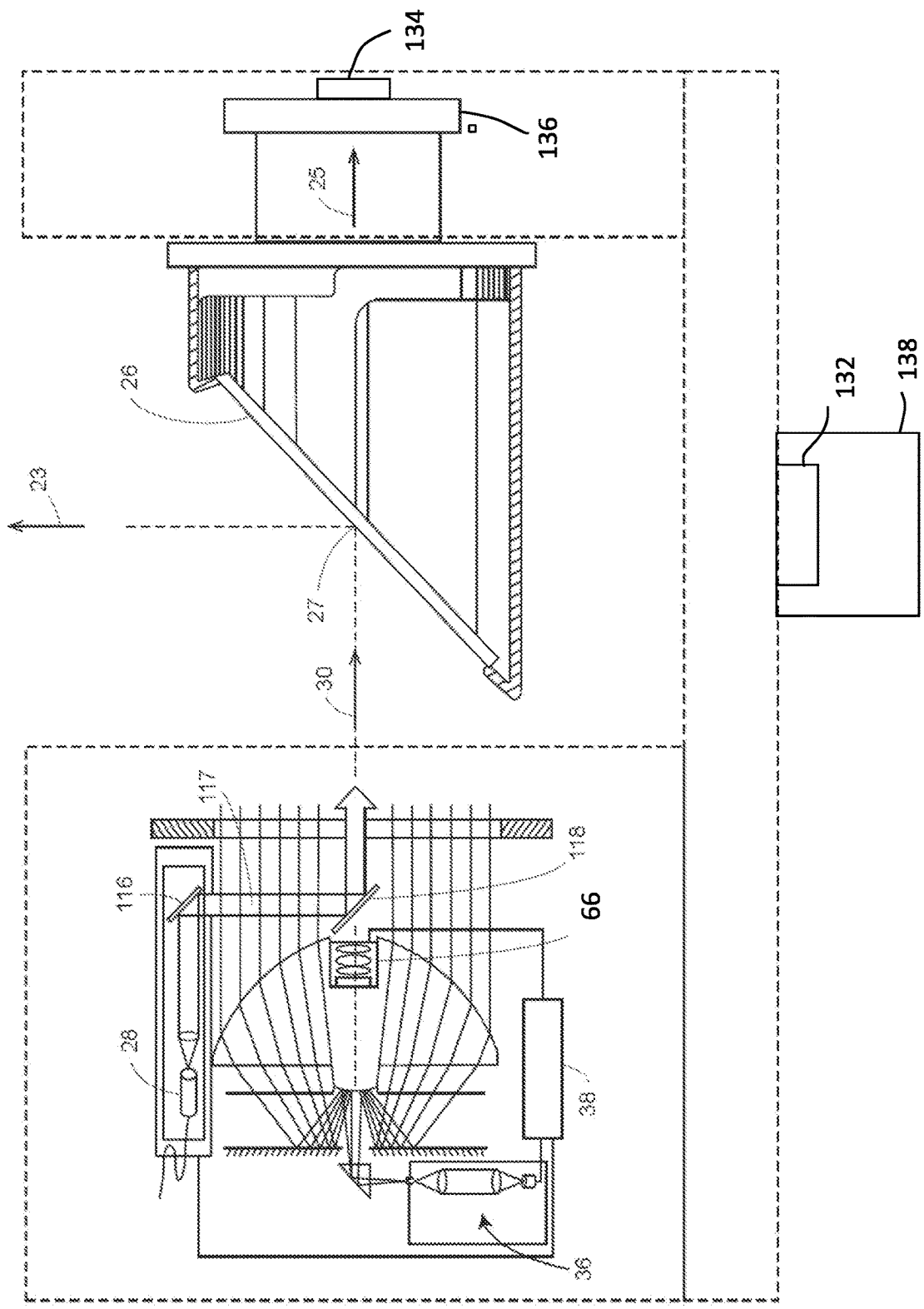

Referring now to FIGS. 4-6, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 30. In one embodiment, the emitted light beam 30 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 30 is amplitude or intensity modulated, for example, with a sinusoidal waveform or with a rectangular waveform. The emitted light beam 30 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 30 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X (FIG. 5), a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system.

In addition to measuring a distance d from the gimbal point 27 to an object point X, the scanner 20 may also collect gray-scale information related to the received intensity (equivalent to the term "brightness" or "optical power") value. The gray-scale value may be determined at least in part, for example, by integration of the bandpass-filtered and amplified signal in the light receiver 36 over a measuring period attributed to the object point X. As will be discussed in more detail herein, the intensity value may be used to enhance color images that are used to colorize the scanned data.

The measuring head 22 may include a display device 40 integrated into the laser scanner 20. The display device 40 may include a graphical touch screen 41, as shown in FIG. 1, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 54 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 54, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 30 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera with an ultrawide-angle lens, sometimes referred to as a "fisheye camera."

In an embodiment, the camera 66 is located internally to the scanner (see FIG. 3) and may have the same optical axis as the 3D scanner device. In this embodiment, the camera 66 is integrated into the measuring head 22 and arranged to acquire images along the same optical pathway as emitted light beam 30 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The camera 66 obtains 2D images of the scanned area to capture color data to add to the captured point cloud. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 7:
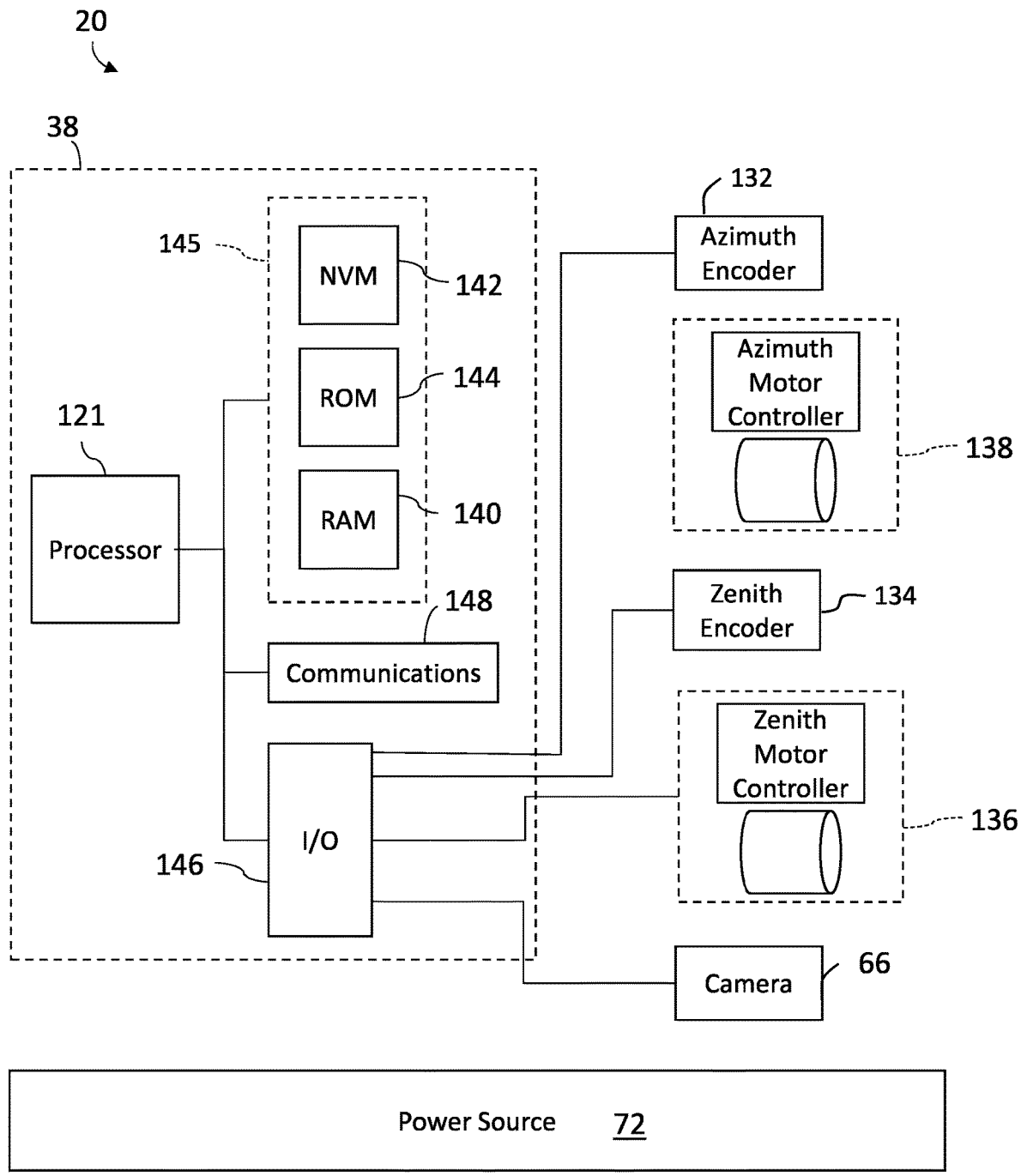
FIG. 7 shows a block diagram of elements of a laser scanner according to one or more embodiments.

Referring now to FIG. 7 with continuing reference to FIGS. 4-6, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 121 have access to memory 125 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 66, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 66 and is given certain instructions for the purpose of generating a 3D point cloud of a scanned environment. Controller 38 provides operating signals to the light source 28, light receiver 36, panoramic camera 66, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface 40 coupled to controller 38. The user interface 40 may be one or more LEDs (light-emitting diodes) 82, an LCD (liquid-crystal diode) display, a CRT (cathode ray tube) display, a touchscreen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet Protocol), RS-232, ModBus, and the like. Additional systems 20 may also be connected to LAN with the controllers 38 in each of these systems 20 being configured to send and receive data to and from remote computers and other systems 20. The LAN may be connected to the Internet. This connection allows controller 38 to communicate with one or more remote computers connected to the Internet.

The processors 121 are coupled to memory 125. The memory 125 may include random access memory (RAM) device 140, a non-volatile memory (NVM) device 142, and a read-only memory (ROM) device 144. In addition, the processors 121 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods described herein, which can be embodied in application code. For example, these methods are embodied in computer instructions written to be executed by processors 121, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hypertext Markup Language), Python, Ruby and any combination or derivative of at least one of the foregoing.

Figure 8A:
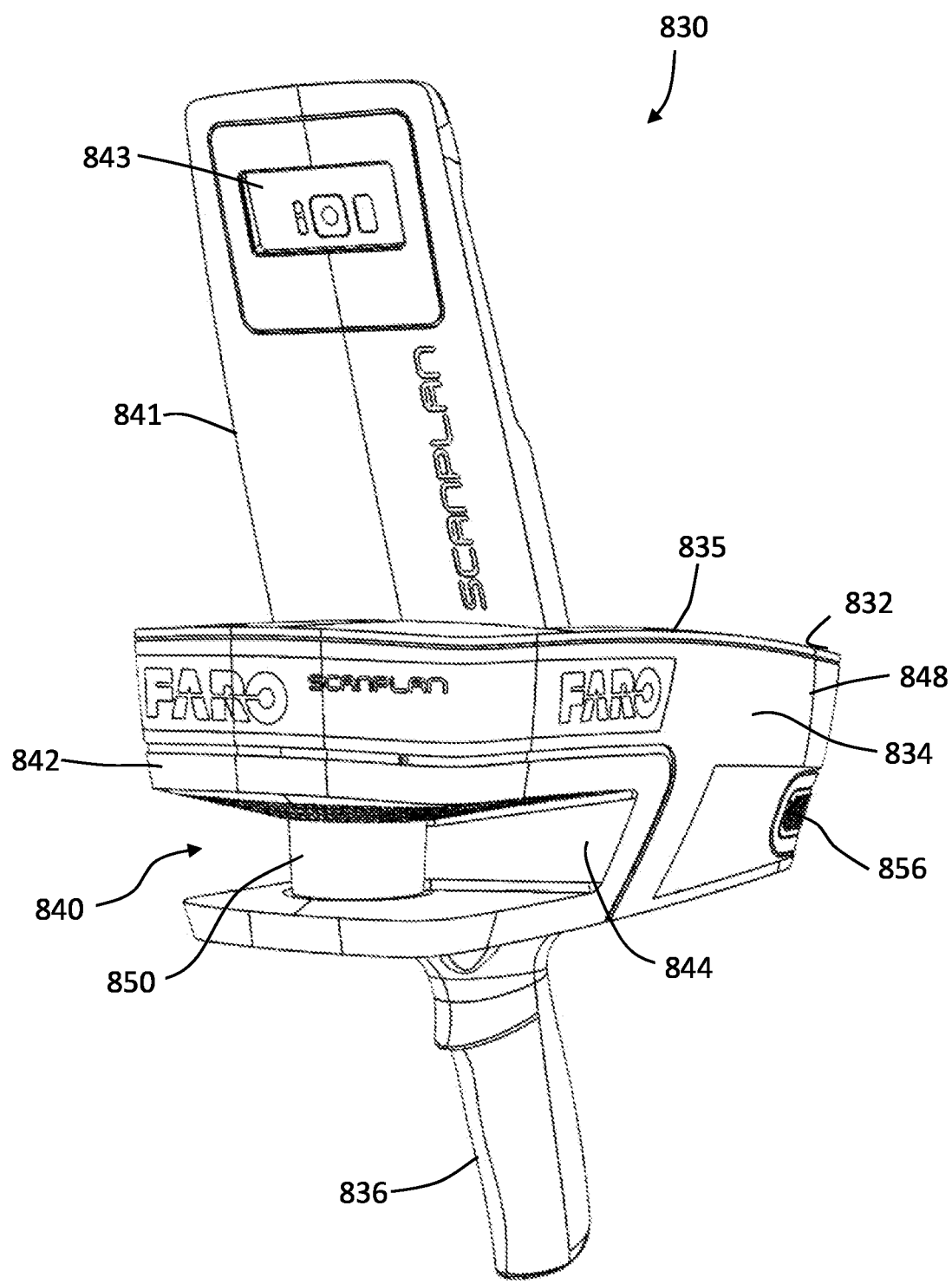
FIGS. 8A-8C depict an embodiment of a 2D scanner.
Figure 8B:
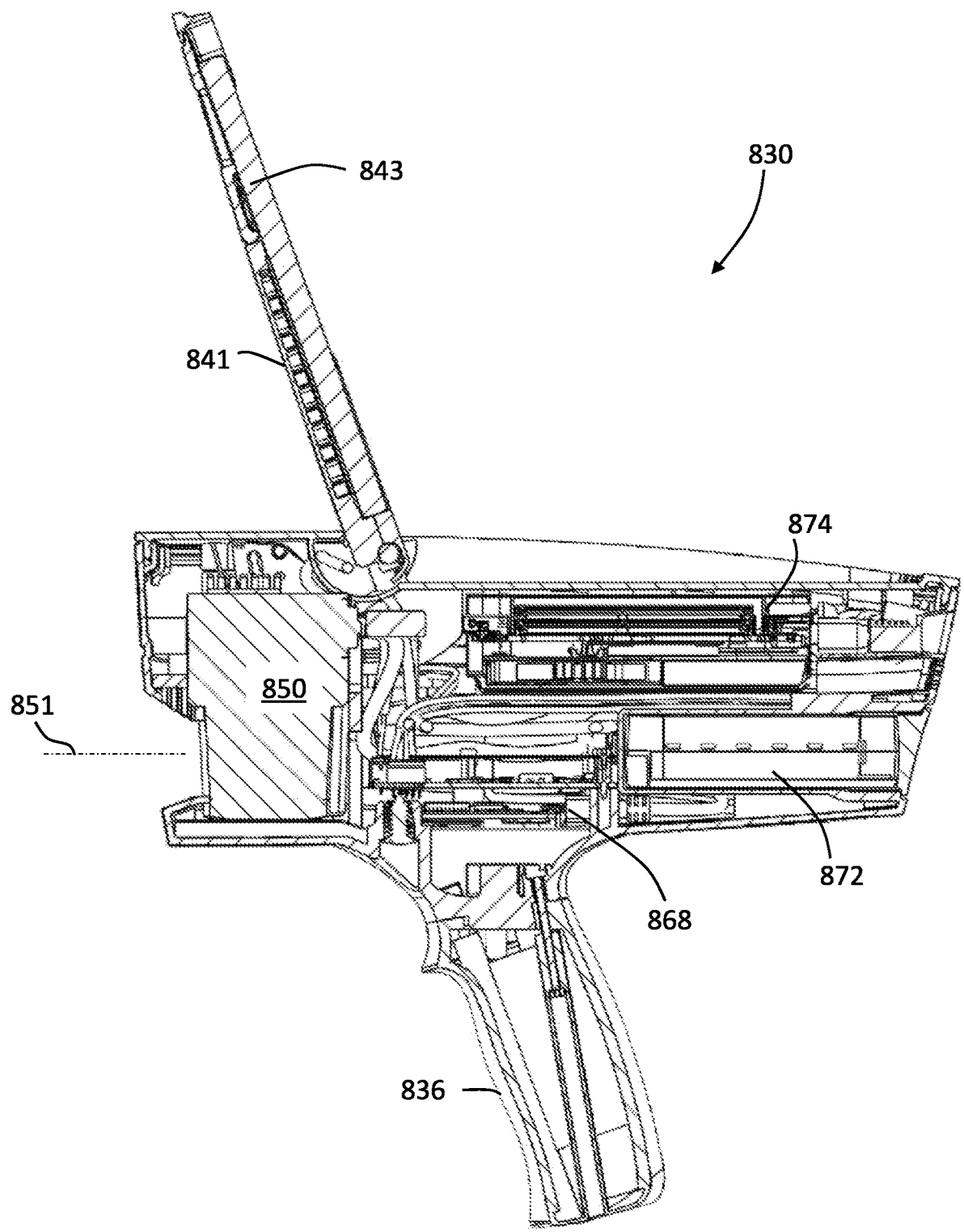
Figure 8C:
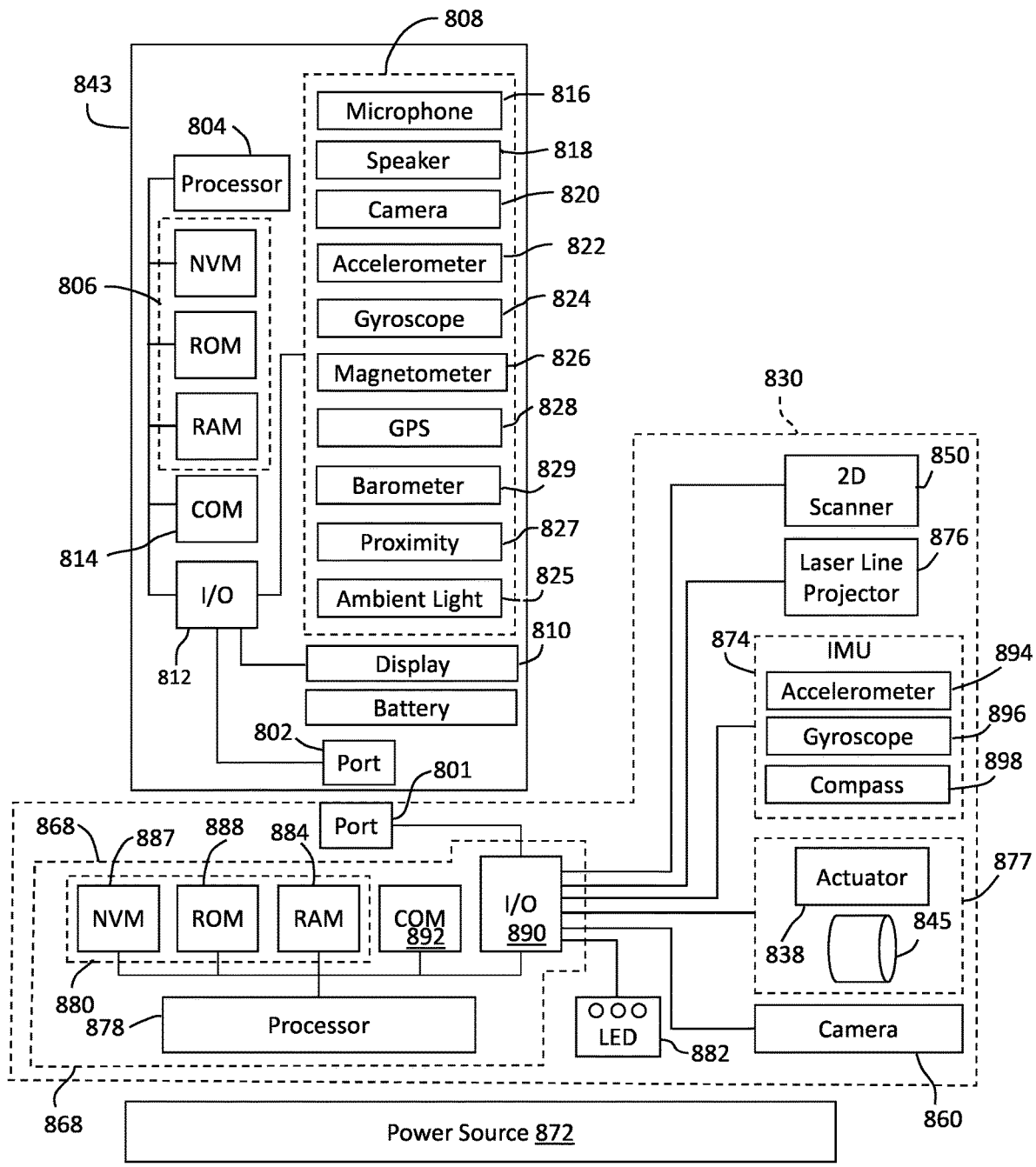

Referring now to FIGS. 8A-8C, an embodiment of a 2D scanner 830 is shown having a housing 832 that includes a body portion 834 and a removable handle portion 836. It should be appreciated that while the embodiment of FIGS. 8A-8C illustrate the 2D scanner 830 with the handle 836 attached, the handle 836 may be removed before the 2D scanner 830 is coupled to the base unit when used in the embodiment shown. In an embodiment, the handle 836 may include an actuator 838 that allows the operator to interact with the scanner 830. In the exemplary embodiment, the body 834 includes a generally rectangular center portion 835 with a slot 840 formed in an end 842. The slot 840 is at least partially defined by a pair walls 844 that are angled towards a second end 848. As will be discussed in more detail herein, a portion of a 2D laser scanner 850 is arranged between the walls 844. The walls 844 are angled to allow the 2D laser scanner 850 to operate by emitting a light over a large angular area without interference from the walls 844. As will be discussed in more detail herein, the end 842 may further include a three-dimensional camera or RGBD camera.

Extending from the center portion 835 is a mobile device holder 841. The mobile device holder 841 is configured to securely couple a mobile device 843 to the housing 832. The holder 841 may include one or more fastening elements, such as a magnetic or mechanical latching element for example, that couples the mobile device 843 to the housing 832. In an embodiment, the mobile device 843 is coupled to communicate with a controller 868. The communication between the controller 868 and the mobile device 843 may be via any suitable communications medium, such as wired, wireless or optical communication mediums for example.

In the illustrated embodiment, the holder 841 is pivotally coupled to the housing 832, such that it may be selectively rotated into a closed position within a recess 846. In an embodiment, the recess 846 is sized and shaped to receive the holder 841 with the mobile device 843 disposed therein.

In the exemplary embodiment, the second end 848 includes a plurality of exhaust vent openings 856. In an embodiment, the exhaust vent openings 856 are fluidly coupled to intake vent openings 858 arranged on a bottom surface 862 of center portion 835. The intake vent openings 858 allow external air to enter a conduit 864 having an opposite opening 866 in fluid communication with the hollow interior 867 of the body 834. In an embodiment, the opening 866 is arranged adjacent to a controller 868 which has one or more processors that is operable to perform the methods described herein. In an embodiment, the external air flows from the opening 866 over or around the controller 868 and out the exhaust vent openings 856.

In an embodiment, the controller 868 is coupled to a wall 870 of body 834. In an embodiment, the wall 870 is coupled to or integral with the handle 836. The controller 868 is electrically coupled to the 2D laser scanner 850, the 3D camera 860, a power source 872, an inertial measurement unit (IMU) 874, a laser line projector 876 (FIG. 8C), and a haptic feedback device 877.

Referring now to FIG. 8C, elements are shown of the scanner 830 with the mobile device 843 installed or coupled to the housing 832. Controller 868 is a suitable electronic device capable of accepting data and instructions, executing the instructions to process the data, and presenting the results. The controller 868 includes one or more processing elements 878. The processors may be microprocessors, field programmable gate arrays (FPGAs), digital signal processors (DSPs), and generally any device capable of performing computing functions. The one or more processors 878 have access to memory 880 for storing information.

Controller 868 is capable of converting the analog voltage or current level provided by 2D laser scanner 850, camera 860 and IMU 874 into a digital signal to determine a distance from the scanner 830 to an object in the environment. In an embodiment, the camera 860 is a 3D or RGBD type camera. Controller 868 uses the digital signals that act as input to various processes for controlling the scanner 830. The digital signals represent one or more scanner 830 data including but not limited to distance to an object, images of the environment, acceleration, pitch orientation, yaw orientation and roll orientation. As will be discussed in more detail, the digital signals may be from components internal to the housing 832 or from sensors and devices located in the mobile device 843.

In general, when the mobile device 843 is not installed, controller 868 accepts data from 2D laser scanner 850 and IMU 874 and is given certain instructions for the purpose of generating a two-dimensional map of a scanned environment. Controller 868 provides operating signals to the 2D laser scanner 850, the camera 860, laser line projector 876 and haptic feedback device 877. Controller 868 also accepts data from IMU 874, indicating, for example, whether the operator is operating in the system in the desired orientation. The controller 868 compares the operational parameters to predetermined variances (e.g. yaw, pitch or roll thresholds) and if the predetermined variance is exceeded, generates a signal that activates the haptic feedback device 877. The data received by the controller 868 may be displayed on a user interface coupled to controller 868. The user interface may be one or more LEDs (light-emitting diodes) 882, an LCD (liquid-crystal diode) display, a CRT (cathode ray tube) display, or the like. A keypad may also be coupled to the user interface for providing data input to controller 868. In one embodiment, the user interface is arranged or executed on the mobile device 843.

The controller 868 may also be coupled to external computer networks such as a local area network (LAN) and the Internet. A LAN interconnects one or more remote computers, which are configured to communicate with controllers 868 using a well-known computer communications protocol such as TCP/IP (Transmission Control Protocol/Internet(^) Protocol), RS-232, ModBus, and the like. Additional scanners 830 may also be connected to LAN with the controllers 868 in each of these scanners 830 being configured to send and receive data to and from remote computers and other scanners 830. The LAN may be connected to the Internet. This connection allows controller 868 to communicate with one or more remote computers connected to the Internet.

The processors 878 are coupled to memory 880. The memory 880 may include random access memory (RAM) device 884, a non-volatile memory (NVM) device 886, a read-only memory (ROM) device 888. In addition, the processors 878 may be connected to one or more input/output (I/O) controllers 890 and a communications circuit 892. In an embodiment, the communications circuit 892 provides an interface that allows wireless or wired communication with one or more external devices or networks, such as the LAN discussed above or the communications circuit 818.

Controller 868 includes operation control methods embodied in application code. These methods are embodied in computer instructions written to be executed by processors 878, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 868 is the 2D laser scanner 850. The 2D laser scanner 850 measures 2D coordinates in a plane. In the exemplary embodiment, the scanning is performed by steering light within a plane to illuminate object points in the environment. The 2D laser scanner 850 collects the reflected (scattered) light from the object points to determine 2D coordinates of the object points in the 2D plane. In an embodiment, the 2D laser scanner 850 scans a spot of light over an angle while at the same time measuring an angle value and corresponding distance value to each of the illuminated object points.

Examples of 2D laser scanners 850 include, but are not limited to Model LMS100 scanners manufactured by Sick, Inc. of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270-degree range and over distances up to 20 meters. The Hoyuko model URG-04LX-UG01 is a low-cost 2D scanner that measures angles over a 240-degree range and distances up to 20 meters. The Hoyuko model UTM-30LX is a 2D scanner that measures angles over a 270-degree range and to distances up to 30 meters. It should be appreciated that the above 2D scanners are exemplary and other types of 2D scanners are also available.

In an embodiment, the 2D laser scanner 850 is oriented so as to scan a beam of light over a range of angles in a generally horizontal plane (relative to the floor of the environment being scanned). At instants in time the 2D laser scanner 850 returns an angle reading and a corresponding distance reading to provide 2D coordinates of object points in the horizontal plane. In completing one scan over the full range of angles, the 2D laser scanner returns a collection of paired angle and distance readings. As the platform is moved from place to place, the 2D laser scanner 850 continues to return 2D coordinate values. These 2D coordinate values are used to locate the position of the scanner 830 thereby enabling the generation of a two-dimensional map or floorplan of the environment.

Also coupled to the controller 886 is the IMU 874. The IMU 874 is a position/orientation sensor that may include accelerometers 894 (inclinometers), gyroscopes 896, a magnetometer or compass 898, and altimeters. In the exemplary embodiment, the IMU 874 includes multiple accelerometers 894 and gyroscopes 896. The compass 898 indicates a heading based on changes in magnetic field direction relative to the earth's magnetic north. The IMU 874 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 874 determines the pose or orientation of the scanner 108 about three-axis to allow a determination of a yaw, roll and pitch parameter.

In the embodiment shown, the scanner 830 further includes a camera 860 that is a 3D or RGB-D camera. As used herein, the term 3D camera refers to a device that produces a two-dimensional image that includes distances to a point in the environment from the location of scanner 830. The 3D camera 860 may be a range camera or a stereo camera. In an embodiment, the 3D camera 860 includes an RGB-D sensor that combines color information with a per-pixel depth information. In an embodiment, the 3D camera 860 may include an infrared laser projector 831, a left infrared camera 833, a right infrared camera 839, and a color camera 837. In an embodiment, the 3D camera 860 is a RealSense™ camera model R200 manufactured by Intel Corporation.

In an embodiment, when the mobile device 843 is coupled to the housing 832, the mobile device 843 becomes an integral part of the scanner 830. In an embodiment, the mobile device 843 is a cellular phone, a tablet computer or a personal digital assistant (PDA). The mobile device 843 may be coupled for communication via a wired connection, such as ports 801, 802. The port 801 is coupled for communication to the processor 878, such as via I/O controller 890 for example. The ports 801, 802 may be any suitable port, such as but not limited to USB, USB-A, USB-B, USB-C, IEEE 1398 (Firewire), or Lightning™ connectors.

The mobile device 843 is a suitable electronic device capable of accepting data and instructions, executing the instructions to process the data, and presenting the results. The mobile device 843 includes one or more processors 804. The processors 804 may be microprocessors, field programmable gate arrays (FPGAs), digital signal processors (DSPs), and generally any device capable of performing computing functions. The one or more processors 804 have access to memory 806 for storing information.

The mobile device 843 is capable of converting the analog voltage or current level provided by sensors 808 and processor 878. Mobile device 843 uses the digital signals that act as input to various processes for controlling the scanner 830. The digital signals represent one or more platform data including but not limited to distance to an object, images of the environment, acceleration, pitch orientation, yaw orientation, roll orientation, global position, ambient light levels, and altitude for example.

In general, mobile device 843 accepts data from sensors 808 and is given certain instructions for the purpose of generating or assisting the processor 878 in the generation of a two-dimensional map or three-dimensional map of a scanned environment. Mobile device 843 provides operating signals to the processor 878, the sensors 808 and a display 810. Mobile device 843 also accepts data from sensors 808, indicating, for example, to track the position of the mobile device 843 in the environment or measure coordinates of points on surfaces in the environment. The mobile device 843 compares the operational parameters to predetermined variances (e.g. yaw, pitch or roll thresholds) and if the predetermined variance is exceeded, may generate a signal. The data received by the mobile device 843 may be displayed on display 810. In an embodiment, the display 810 is a touch screen device that allows the operator to input data or control the operation of the scanner 830.

The controller 868 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. Additional scanners 830 may also be connected to LAN with the controllers 868 in each of these scanners 830 being configured to send and receive data to and from remote computers and other scanners 830. The LAN may be connected to the Internet. This connection allows controller 868 to communicate with one or more remote computers connected to the Internet.

The processors 804 are coupled to memory 806. The memory 806 may include random access memory (RAM) device, a non-volatile memory (NVM) device, and a read-only memory (ROM) device. In addition, the processors 804 may be connected to one or more input/output (I/O) controllers 812 and a communications circuit 814. In an embodiment, the communications circuit 814 provides an interface that allows wireless or wired communication with one or more external devices or networks, such as the LAN or the cellular network discussed above.

Controller 868 includes operation control methods embodied in application code. These methods are embodied in computer instructions written to be executed by processors 878, 804, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Also coupled to the processor 804 are the sensors 808. The sensors 808 may include but are not limited to: a microphone 816; a speaker 818; a front or rear facing camera 820; accelerometers 822 (inclinometers), gyroscopes 824; a magnetometers or compass 826; a global positioning satellite (GPS) module 828; a barometer 829; a proximity sensor 827; and an ambient light sensor 825. By combining readings from a combination of sensors 808 with a fusion algorithm that may include a Kalman filter, relatively accurate position and orientation measurements can be obtained.

It should be appreciated that the sensors 860, 874 integrated into the scanner 830 may have different characteristics than the sensors 808 of mobile device 843. For example, the resolution of the cameras 860, 820 may be different, or the accelerometers 894, 822 may have different dynamic ranges, frequency response, sensitivity (mV/g) or temperature parameters (sensitivity or range). Similarly, the gyroscopes 896, 824 or compass/magnetometer may have different characteristics. It is anticipated that in some embodiments, one or more sensors 808 in the mobile device 843 may be of higher accuracy than the corresponding sensors 874 in the scanner 830. As described in more detail herein, in some embodiments the processor 878 determines the characteristics of each of the sensors 808 and compares them with the corresponding sensors in the scanner 830 when the mobile device. The processor 878 then selects which sensors 874, 808 are used during operation. In some embodiments, the mobile device 843 may have additional sensors (e.g. microphone 816, camera 820) that may be used to enhance operation compared to operation of the scanner 830 without the mobile device 843. In still further embodiments, the scanner 830 does not include the IMU 874 and the processor 878 uses the sensors 808 for tracking the position and orientation/pose of the scanner 830. In still further embodiments, the addition of the mobile device 843 allows the scanner 830 to utilize the camera 820 to perform three-dimensional (3D) measurements either directly (using an RGB-D camera) or using photogrammetry techniques to generate 3D maps. In an embodiment, the processor 878 uses the communications circuit (e.g. a cellular 8G internet connection) to transmit and receive data from remote computers or devices.

In an embodiment, the scanner 830 determines a quality attribute/parameter for the tracking of the scanner 830 and/or the platform. In an embodiment, the tracking quality attribute is a confidence level in the determined tracking positions and orientations to actual positions and orientations. When the confidence level crosses a threshold, the scanner 830 may provide feedback to the operator to perform a stationary scan. It should be appreciated that a stationary scan will provide a highly accurate measurements that will allow the determination of the position and orientation of the scanner or platform with a high level of confidence. In an embodiment, the feedback is provided via a user interface. The user interface may be on the scanner 830, or a platform associated with the scanner 830.

In the exemplary embodiment, the scanner 830 is a handheld portable device that is sized and weighted to be carried by a single person during operation. Therefore, the plane 809 in which the 2D laser scanner 850 projects a light beam may not be horizontal relative to the floor or may continuously change as the computer moves during the scanning process. Thus, the signals generated by the accelerometers 894, gyroscopes 896 and compass 898 (or the corresponding sensors 808) may be used to determine the pose (yaw, roll, tilt) of the scanner 108 and determine the orientation of the plane 851.

In an embodiment, it may be desired to maintain the pose of the scanner 830 (and thus the plane 809) within predetermined thresholds relative to the yaw, roll and pitch orientations of the scanner 830. In an embodiment, a haptic feedback device 877 is disposed within the housing 832, such as in the handle 836. The haptic feedback device 877 is a device that creates a force, vibration or motion that is felt or heard by the operator. The haptic feedback device 877 may be, but is not limited to: an eccentric rotating mass vibration motor or a linear resonant actuator for example. The haptic feedback device is used to alert the operator that the orientation of the light beam from 2D laser scanner 850 is equal to or beyond a predetermined threshold. In operation, when the IMU 874 measures an angle (yaw, roll, pitch or a combination thereof), the controller 868 transmits a signal to a motor controller 838 that activates a vibration motor 845. Since the vibration originates in the handle 836, the operator will be notified of the deviation in the orientation of the scanner 830. The vibration continues until the scanner 830 is oriented within the predetermined threshold or the operator releases the actuator 838. In an embodiment, it is desired for the plane 809 to be within 10-15 degrees of horizontal (relative to the ground) about the yaw, roll and pitch axes.

Figure 9:
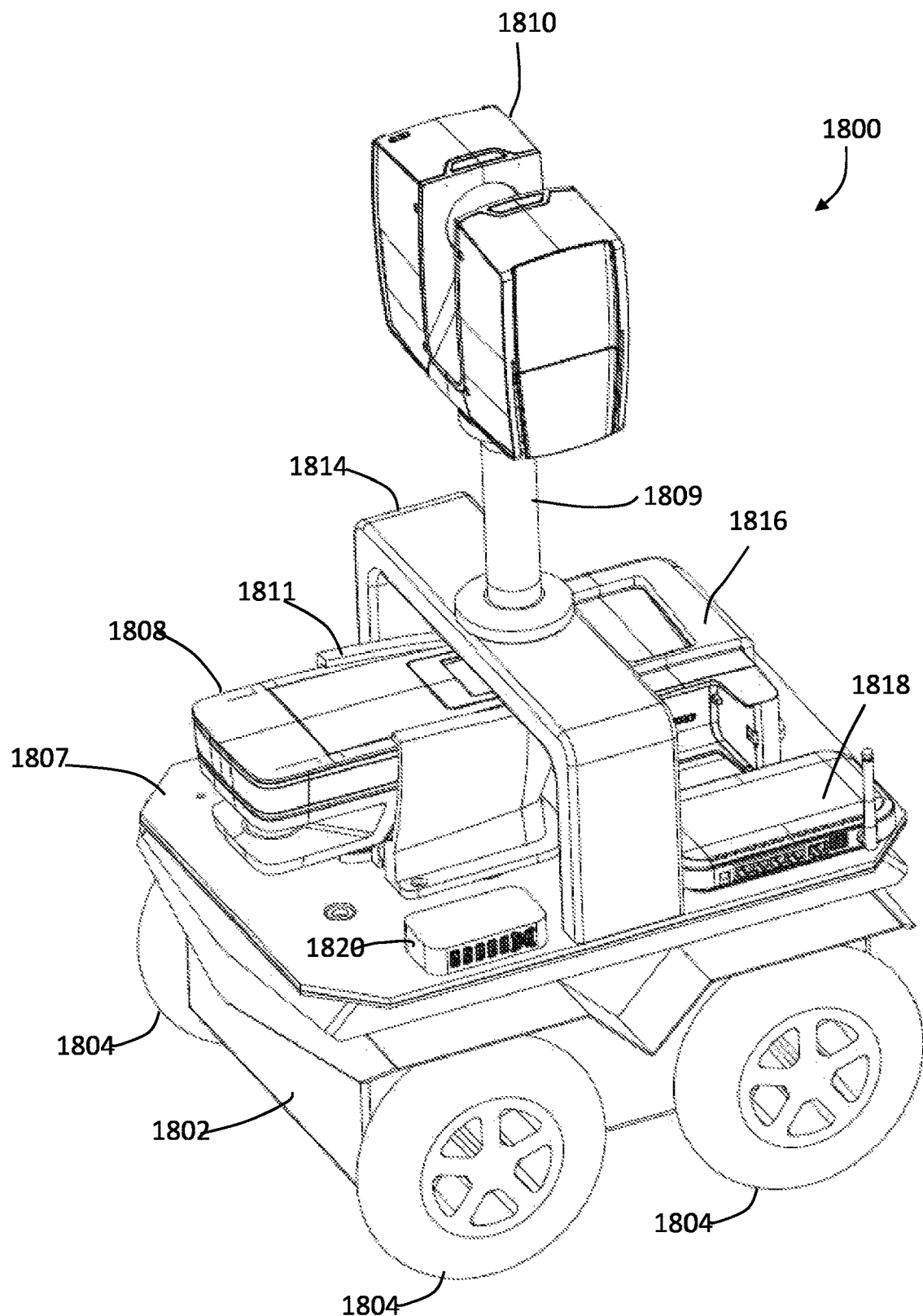
FIGS. 9-11 depict an embodiment of a mobile scanning platform.
Figure 10:
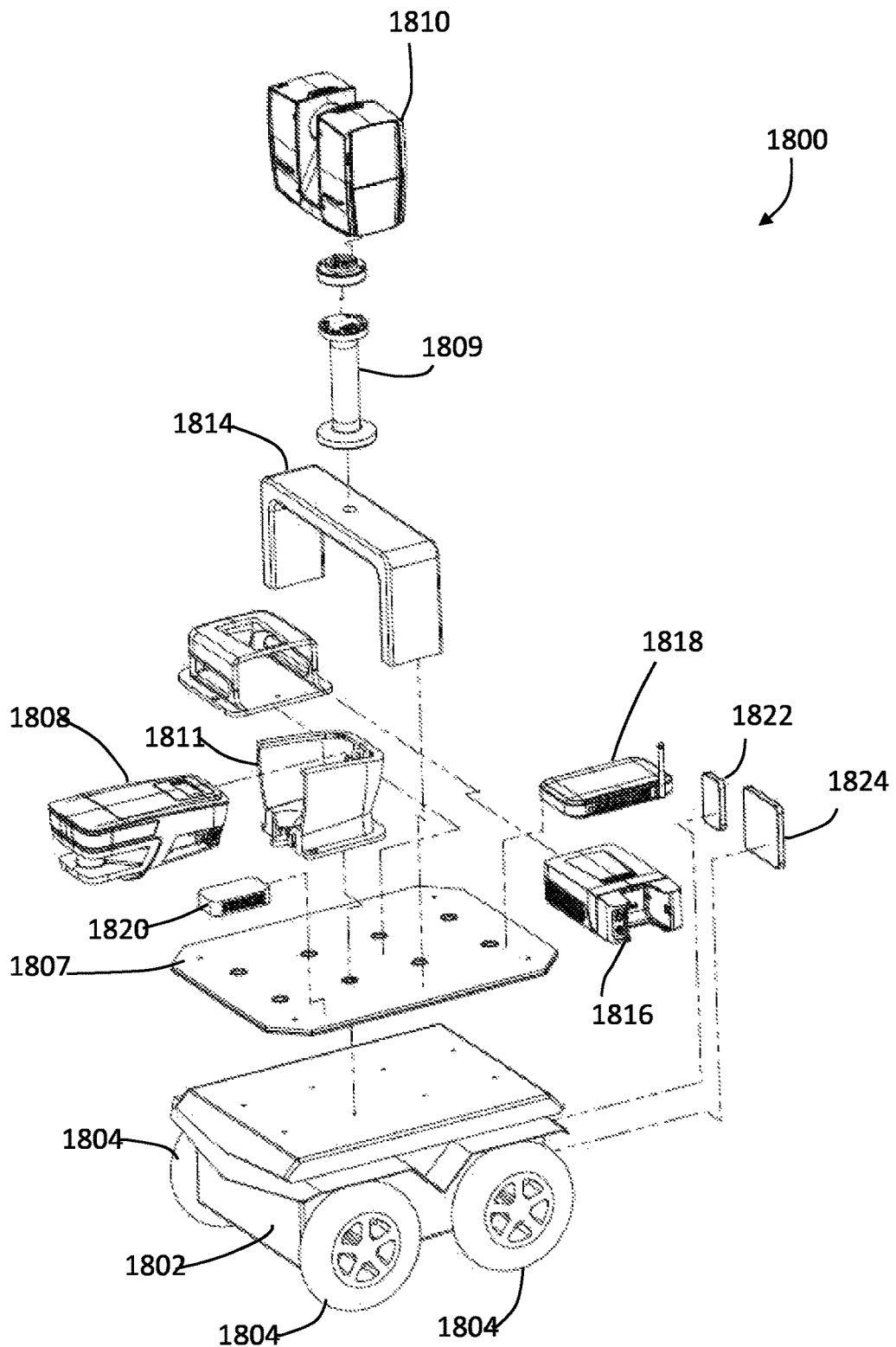
Figure 11:
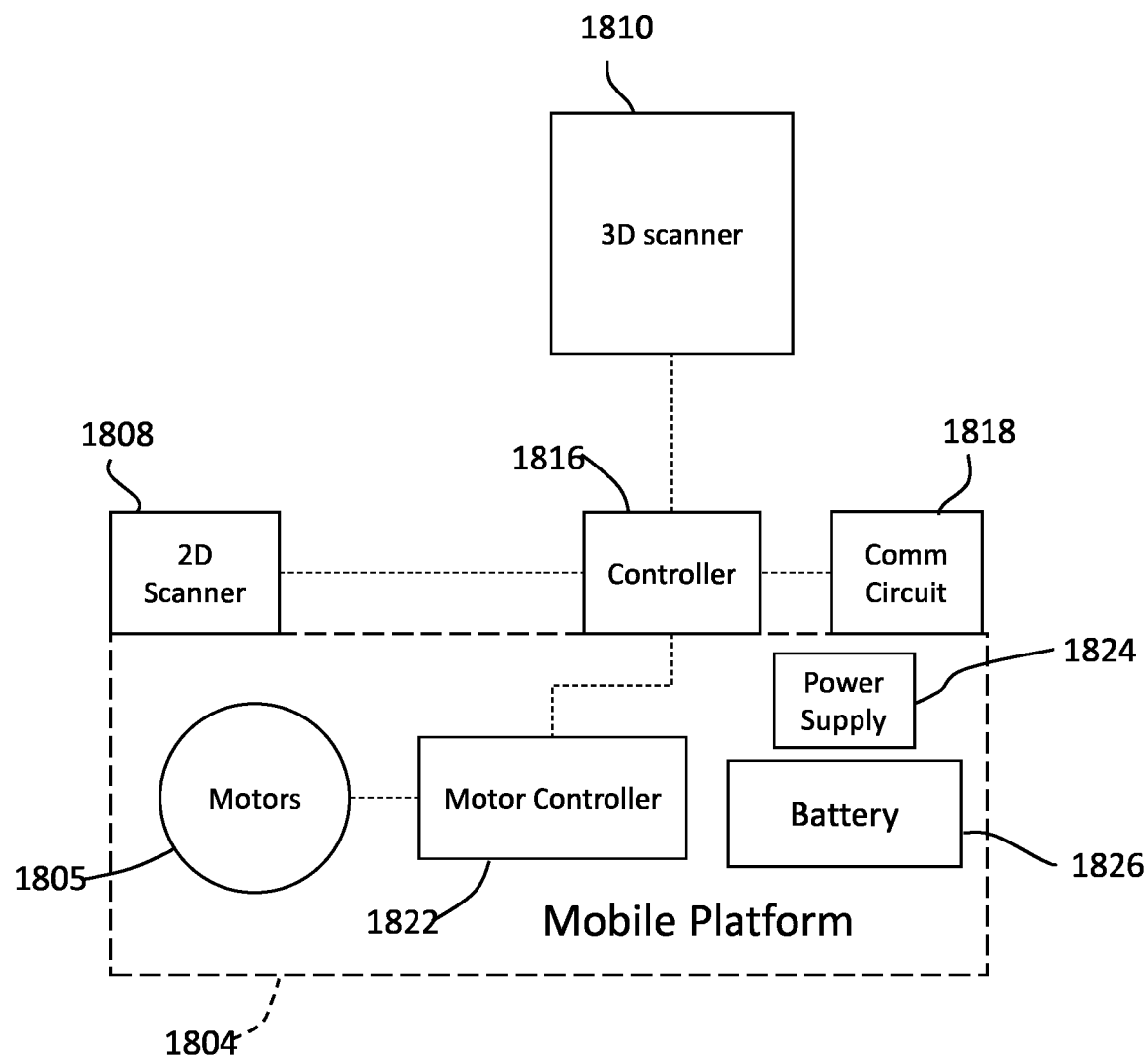

Referring now to FIGS. 9-11, an embodiment is shown of a mobile scanning platform 1800. The mobile scanning platform 1800 can be used as the scanner 120. The mobile scanning platform 1800 includes a base unit 1802 having a plurality of wheels 1804. The wheels 1804 are rotated by motors 1805. In an embodiment, an adapter plate 1807 is coupled to the base unit 1802 to allow components and modules to be coupled to the base unit 1802. The mobile scanning platform 1800 further includes a 2D scanner 1808 and a 3D scanner 1810. In the illustrated embodiment, each scanner 1808, 1810 is removably coupled to the adapter plate 1806. The 2D scanner 1808 may be the scanner illustrated and described herein. As will be described in more detail herein, in some embodiments the 2D scanner 1808 is removable from the adapter plate 1806 and is used to generate a map of the environment, plan a path for the mobile scanning platform to follow, and define 3D scanning locations. In the illustrated embodiment, the 2D scanner 1808 is slidably coupled to a bracket 1811 that couples the 2D scanner 1808 to the adapter plate 1807.

In an embodiment, the 3D scanner 1810 is a time-of-flight (TOF) laser scanner such as that shown and described herein. The scanner 1810 may be that described in commonly owned U.S. Pat. No. 8,705,012, which is incorporated by reference herein. In an embodiment, the 3D scanner 1810 mounted on a pedestal or post 1809 that elevates the 3D scanner 1810 above (e.g. further from the floor than) the other components in the mobile scanning platform 1800 so that the emission and receipt of the light beam is not interfered with. In the illustrated embodiment, the pedestal 1809 is coupled to the adapter plate 1807 by a u-shaped frame 1814.

In an embodiment, the mobile scanning platform 1800 further includes a controller 1816. The controller 1816 is a computing device having one or more processors and memory. The one or more processors are responsive to non-transitory executable computer instructions for performing operational methods such as those described herein. The processors may be microprocessors, field programmable gate arrays (FPGAs), digital signal processors (DSPs), and generally any device capable of performing computing functions. The one or more processors have access to memory for storing information.

Coupled for communication to the controller 1816 is a communications circuit 1818 and an input/output hub 1820. In the illustrated embodiment, the communications circuit 1818 is configured to transmit and receive data via a wireless radio-frequency communications medium, such as WIFI or Bluetooth for example. In an embodiment, the 2D scanner 1808 communicates with the controller 1816 via the communications circuit 1818.

In an embodiment, the mobile scanning platform 1800 further includes a motor controller 1822 that is operably coupled to the control the motors 1805. In an embodiment, the motor controller 1822 is mounted to an external surface of the base unit 1802. In another embodiment, the motor controller 1822 is arranged internally within the base unit 1802. The mobile scanning platform 1800 further includes a power supply 1824 that controls the flow of electrical power from a power source, such as batteries 1826 for example. The batteries 1826 may be disposed within the interior of the base unit 1802. In an embodiment, the base unit 1802 includes a port (not shown) for coupling the power supply to an external power source for recharging the batteries 1826. In another embodiment, the batteries 1826 are removable or replaceable.

Figure 13:
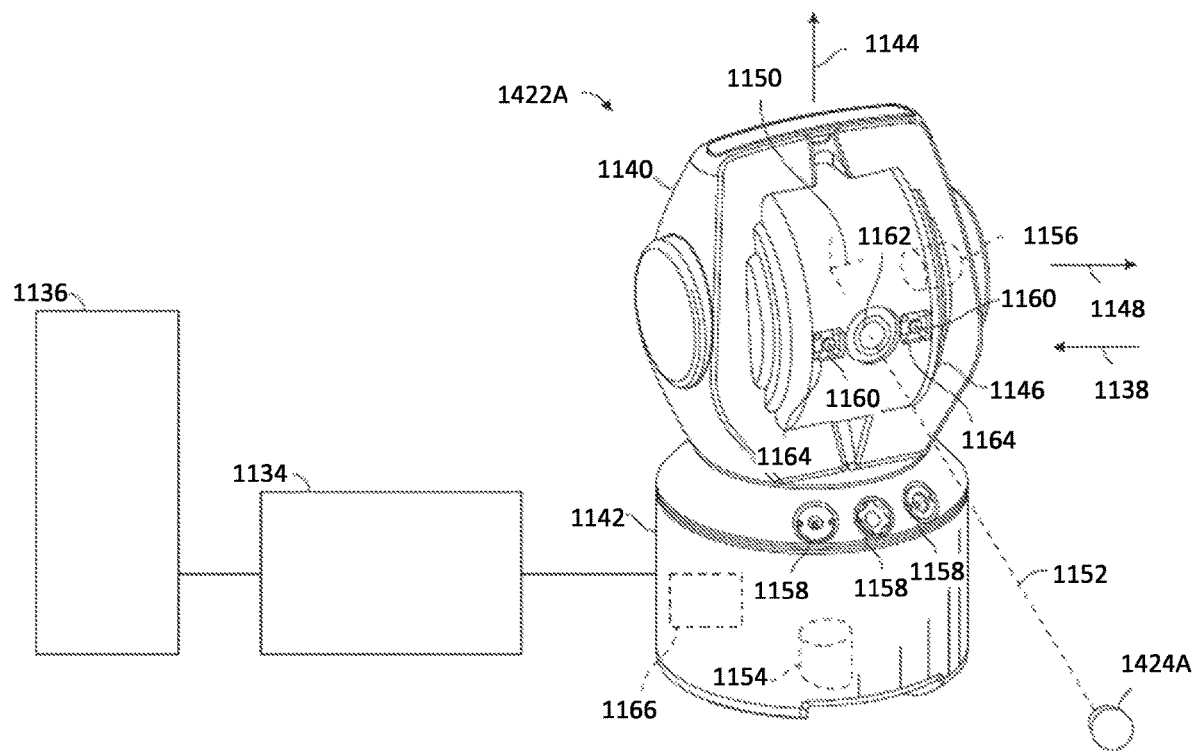
Figure 14:
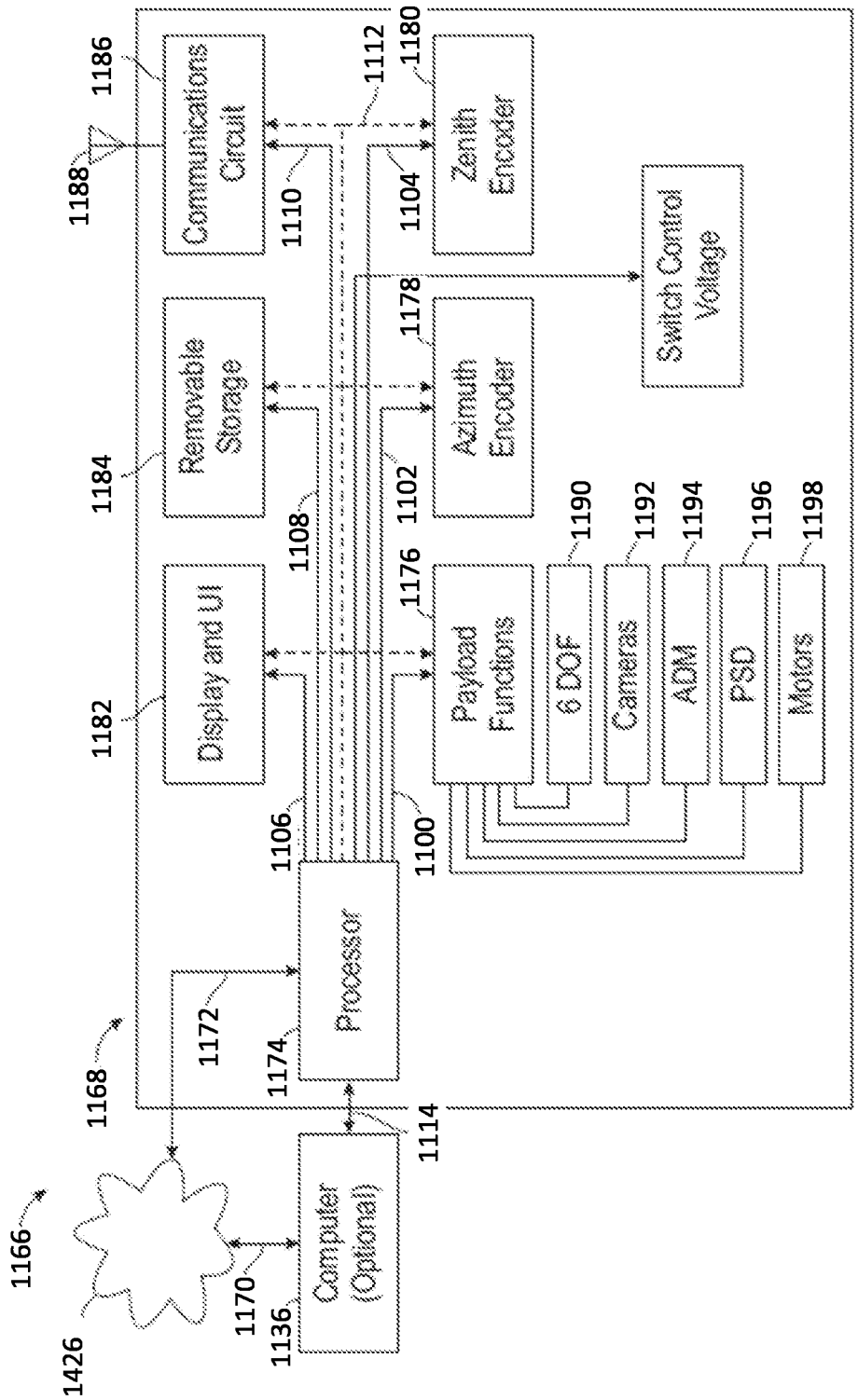

Referring now to FIGS. 12-14, an embodiment of the laser tracker device 1422A will be described. In some embodiments, one or more of the laser tracker devices 1422A-1422E may be constructed in a manner similar to those described in commonly owned U.S. Pat. Nos. 8,558,992, 8,537,376, 8,724,120, and 7,583,375, the contents of which are incorporated by reference herein. In an embodiment, the laser tracker device 1422A includes an optional auxiliary unit processor 1134, and an optional auxiliary computer 1136. In an embodiment, one or both of the auxiliary unit processor 1134 or the auxiliary computer 1136 may be a node, such as node 1428 for example, on the computer network 1426. An exemplary gimbaled beam-steering mechanism 38 of laser tracker device 1422A comprises a zenith carriage 1140 mounted on an azimuth base 1142 and rotated about an azimuth axis 1144. A payload 1146 is mounted on the zenith carriage 1140 and rotated about a zenith axis 1148. Zenith axis 1148 and azimuth axis 1144 intersect orthogonally, internally to laser tracker device 1422A, at gimbal point 1150, which is typically the origin for distance measurements. A light beam 1152 virtually passes through the gimbal point 1150 and is pointed orthogonal to zenith axis 1148. In other words, laser beam 1152 lies in a plane approximately perpendicular to the zenith axis 1148 and that passes through the azimuth axis 1144. Outgoing laser beam 1152 is pointed in the desired direction by rotation of payload 1146 about zenith axis 1148 and by rotation of zenith carriage 1140 about azimuth axis 1144.

In an embodiment, the payload 1146 is rotated about the azimuth axis 1144 and zenith axis 1148 by motors 1154, 1156 respectively. The motors 1154, 1156 may be located internal to the laser tracker device 1422A and are aligned with the mechanical axes 1144, 1148. A zenith angular encoder, internal to the laser tracker device 1422A, is attached to a zenith mechanical axis aligned to the zenith axis 1148. An azimuth angular encoder, internal to the tracker, is attached to an azimuth mechanical axis aligned to the azimuth axis 1144. The zenith and azimuth angular encoders measure the zenith and azimuth angles of rotation to relatively high accuracy. Outgoing laser beam 1152 travels to a retroreflector target, such as retroreflective target 1424A for example. In an embodiment, the retroreflective target may be a spherically mounted retroreflector (SMR) for example. By measuring the radial distance between gimbal point 1150 and retroreflective target 1424A, the rotation angle about the zenith axis 1148, and the rotation angle about the azimuth axis 1144, the position of retroreflective target 1424A may be found within the spherical coordinate system of the laser tracker device 1422A.

Outgoing light beam 1152 may include one or more wavelengths. For the sake of clarity and simplicity, a steering mechanism of the sort shown in FIG. 12 is assumed in the following discussion. However, other types of steering mechanisms are possible. For example, it is possible to reflect a laser beam off a mirror rotated about the azimuth and zenith axes. The techniques described herein are applicable, regardless of the type of steering mechanism.

Magnetic nests 1158 may be included on the laser tracker for resetting the laser tracker to a "home" position for different sized SMRs—for example, 1.5, ⅞, and ½ inch SMRs. In addition, an on-tracker mirror, not visible from the view of FIG. 12, may be used in combination with the on-tracker retroreflector to enable performance of a self-compensation.

As will be discussed in more detail herein, one or more target cameras 1160 may be disposed on the payload 1146 adjacent the aperture 1162 from which the light beam 1152 is emitted. In an embodiment, the cameras 1160 enable the user to view the environment in the direction of the laser tracker device 1422A via the display on the mobile computing device 30. In an embodiment, the laser tracker device 1422A may also have one or more light sources 1164 located on the payload 1146 adjacent the cameras 1160. As will be discussed in more detail herein, the light sources 1164 may be selectively activated on a periodic or aperiodic basis to emit light into the environment to assist in the identification of retroreflective targets 1424A-1424D.

FIG. 13 is a block diagram depicting a dimensional measurement electronics processing system 1166 that includes a laser tracker electronics processing system 1168 and computer 1136. The processing system 1168 may be connected to the computer network 1426 via computer 1136 and communications medium 1170 or directly via a communication medium 1172. Exemplary laser tracker electronics processing system 1168 includes one or more processors 1174, payload functions electronics 1176, azimuth encoder electronics 1178, zenith encoder electronics 1180, display electronics 1182, removable storage hardware 1184, communications circuit 1186 electronics, and in an embodiment an antenna 1188. The payload functions electronics 1176 includes a number of subfunctions including the six-DOF electronics 1190, the camera electronics 1192, the absolute distance meter (ADM) electronics 1194, the position detector (PSD) electronics 1196, and motor controller electronics 1198. Most of the subfunctions have at least one processor unit, which might be a digital signal processor (DSP) or field programmable gate array (FPGA), for example. In an embodiment, the payload functions 1176 are located in the payload 1146. In some embodiments, the azimuth encoder electronics 1178 are located in the azimuth assembly and the zenith encoder electronics 1180 are located in the zenith assembly.

As used herein, when a reference is made to one or more processors of the laser tracker device 1422A, it is meant to include possible external computer and cloud support.

In an embodiment, a separate communications bus goes from the processor 1174 to each of the electronics units 1176, 1178, 1180, 1182, 1184, and 1186. Each communications line may have, for example, three serial lines that include the data line, clock line, and frame line. The frame line indicates whether or not the electronics unit should pay attention to the clock line. If it indicates that attention should be given, the electronics unit reads the current value of the data line at each clock signal. The clock-signal may correspond, for example, to a rising edge of a clock pulse. In an embodiment, information is transmitted over the data line in the form of a packet. In an embodiment, each packet includes an address, a numeric value, a data message, and a checksum. The address indicates where, within the electronics unit, the data message is to be directed. The location may, for example, correspond to a processor subroutine within the electronics unit. The numeric value indicates the length of the data message. The data message contains data or instructions for the electronics unit to carry out. The checksum is a numeric value that is used to minimize the chance that errors are transmitted over the communications line.

In an embodiment, the processor 1174 sends packets of information over bus 1100 to payload functions electronics 1176, over bus 1102 to azimuth encoder electronics 1178, over bus 1104 to zenith encoder electronics 1180, over bus 1106 to display and UI electronics 1182, over bus 1108 to removable storage hardware 1184, and over bus 1110 to communications circuit 1186.

In an embodiment, processor 1174 also sends a synch (synchronization) pulse over the synch bus 1112 to each of the electronics units at the same time. The synch pulse provides a way of synchronizing values collected by the measurement functions of the laser tracker. For example, the azimuth encoder electronics 1178 and the zenith electronics 1180 latch their encoder values as soon as the synch pulse is received. Similarly, the payload functions electronics 1176 latch the data collected by the electronics contained within the payload. The six-DOF, ADM, and position detector all latch data when the synch pulse is given. In most cases, the camera and inclinometer collect data at a slower rate than the synch pulse rate but may latch data at multiples of the synch pulse period.

In an embodiment, the azimuth encoder electronics 1178 and zenith encoder electronics 1180 are separated from one another and from the payload functions 1176 by slip rings, which are electromechanical devices that allow the transmission of electrical power and electrical signals from a stationary to a rotating structure, and vice versa. For this reason, the bus lines 1100, 1102, and 1104 are depicted as separate bus lines.

The laser tracker electronics processing system 1168 may communicate with an external computer 1136, or it may provide computation, display, and UI functions within the laser tracker. The laser tracker communicates with computer 1136 over communications link 114, which might be, for example, an Ethernet line or a wireless connection. The laser tracker may also communicate with other elements such as node 1428, via computer network 1426, through communications medium 1172, which might include one or more electrical cables, such as Ethernet cables, and one or more wireless connections. It should be appreciated that while FIG. 13 illustrates the communications medium 1172 as extending from the computer network 1426 directly to the processor 1174, signals may be transmitted and received via the communications circuit 1186. As discussed in more detail herein, a user having the mobile computing device 30 may have a connection to the computer network 1426 over an Ethernet or wireless communications medium, which in turn connects to the processor 1174 over an Ethernet or wireless communications medium. In this way, a user may control the functions of a remote laser tracker.

In an embodiment, a laser tracker may use one visible wavelength (usually red) and one infrared wavelength for the ADM. The red wavelength may be provided by a frequency stabilized helium-neon (HeNe) laser suitable for use in an interferometer and also for use in providing a red pointer beam. In other embodiments, the red wavelength may be provided by a diode laser that serves just as a pointer beam. In another embodiment, a laser tracker uses a single visible wavelength (for example, red) for both the ADM and the pointer beam.

Figure 15:
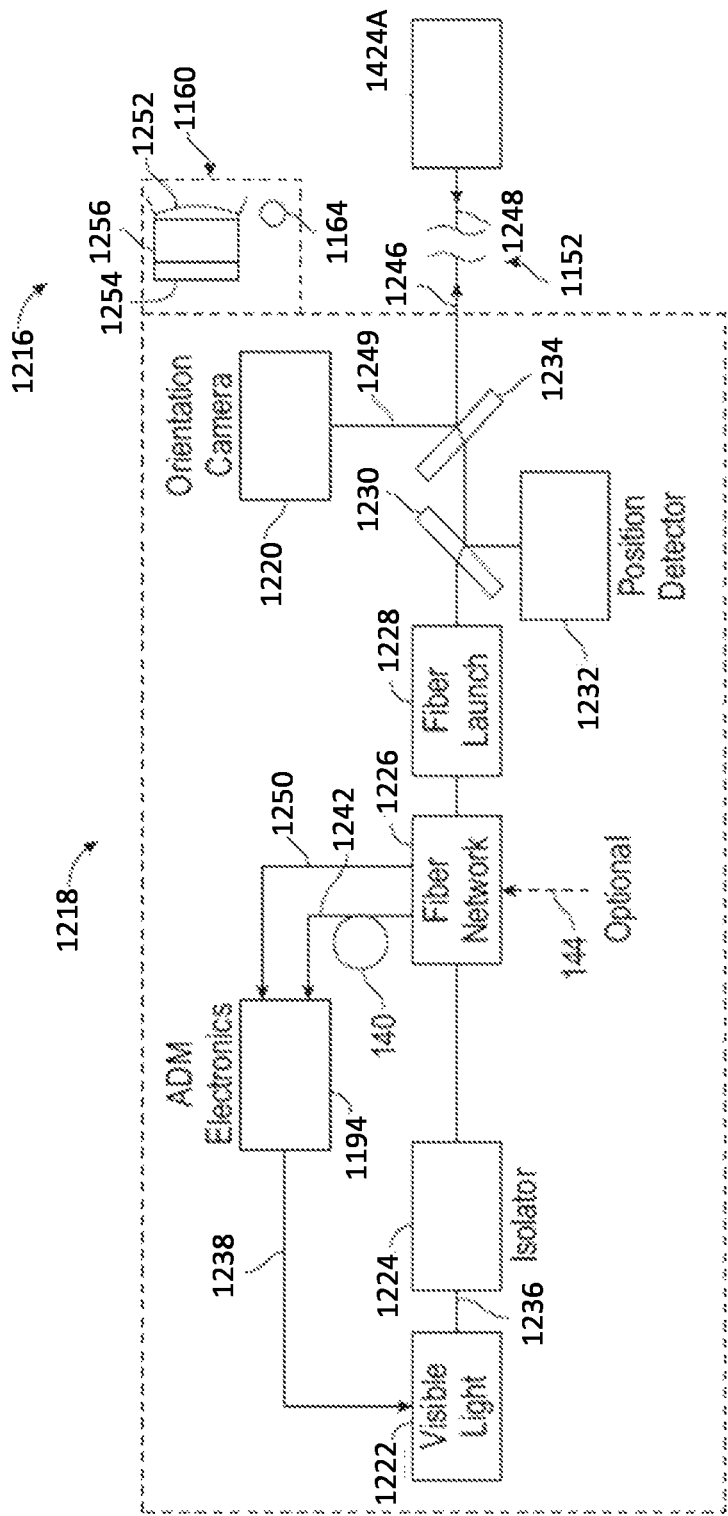
FIG. 15 shows a block diagram of elements of a laser tracker device.

FIG. 15 shows an embodiment of a laser tracker device having a target camera system 1116 and an optoelectronic system 1118 in which an optional orientation camera 1220 is combined with the optoelectronic functionality of a 3D laser tracker to measure the distance to the retroreflective target 1424A. In an embodiment, the optoelectronic system 1118 includes a visible light source 1222, an isolator 1224, ADM electronics 1194, a fiber network 1226, a fiber launch 1228, a beam splitter 1230, a position detector 1232, a beam splitter 1234, and an optional orientation camera 1220. The light from the visible light source 1222 is emitted in optical fiber 1236 and travels through isolator 1224, which may have optical fibers coupled on the input and output ports. The ADM electronics 1194 sends an electrical signal over connection 1238 to modulate the visible light source 1222. Some of the light entering the fiber network travels through the fiber length equalizer 1240 and the optical fiber 1242 to enter the reference channel of the ADM electronics 1194. An electrical signal 1244 may optionally be applied to the fiber network 1226 to provide a switching signal to a fiber optic switch within the fiber network 1226. A part of the light travels from the fiber network to the fiber launch 1228, which sends the light on the optical fiber into free space as light beam 1246. A small amount of the light reflects off the beam splitter 1230 and is lost. A portion of the light passes through the beam splitter 1230, through the beam splitter 1234, and travels out of the tracker to retroreflective target 1424A.

On its return path, the light 1248 from the retroreflective target 1424A enters the optoelectronic system 1118 and arrives at beam splitter 1234. Part of the light is reflected off the beam splitter 1234 and enters the optional orientation camera 1220. The optional orientation camera 1220 records an image of the light 1249, which is evaluated by a processor to determine three orientational degrees-of-freedom of the retroreflector target 1424A. A portion of the light at beam splitter 1230 travels through the beam splitter and is put onto an optical fiber by the fiber launch 1228. The light travels to fiber network 1226. Part of this light travels to optical fiber 1250, from which it enters the measure channel of the ADM electronics 1194.

The target camera system 1116 includes one or more cameras 1160, each having one or more light sources 1164. The target camera system 1116 is also shown in FIG. 12. The camera 1160 includes a lens system 1252, a photosensitive array 1254, and a body 1256. One use of the target camera system 1116 is to locate retroreflector targets in the work volume. In an embodiment, each target camera does this by flashing the light source 1164, which the camera 1160 picks up as a bright spot on the photosensitive array 1254. As will be discussed in more detail herein, the system 20 is configured to determine and identify retroreflective targets based on the light from light source 1164. The system 20 is further configured to evaluate the images captured by the cameras 1160 to distinguish light reflected by the retroreflective targets from other sources of light. Further, the image acquired by camera 1160 may also be transmitted to the mobile computing device where the user may interact with the laser tracker device, such as by reorienting the position of the payload using the image. It should be appreciated that while embodiments herein may refer to "an image", this is for exemplary purposes and the claims should not be so narrowly construed as to require a single image. In some embodiments, the camera 1160 acquires a video image (e.g. 30 frames per second).

It should be appreciated that the optoelectronic system 1118 illustrated in FIG. 14 is exemplary and not intended to be limiting. In other embodiments, the optoelectronic system may include additional or fewer components. For example, in some embodiments, the optoelectronic system may include an interferometer for example. The interferometer may be in place of the ADM 1194 or used in combination with the ADM 1194. In other embodiments, the optoelectronic system 1118 may not include the orientation camera 1220.

Figure 16:
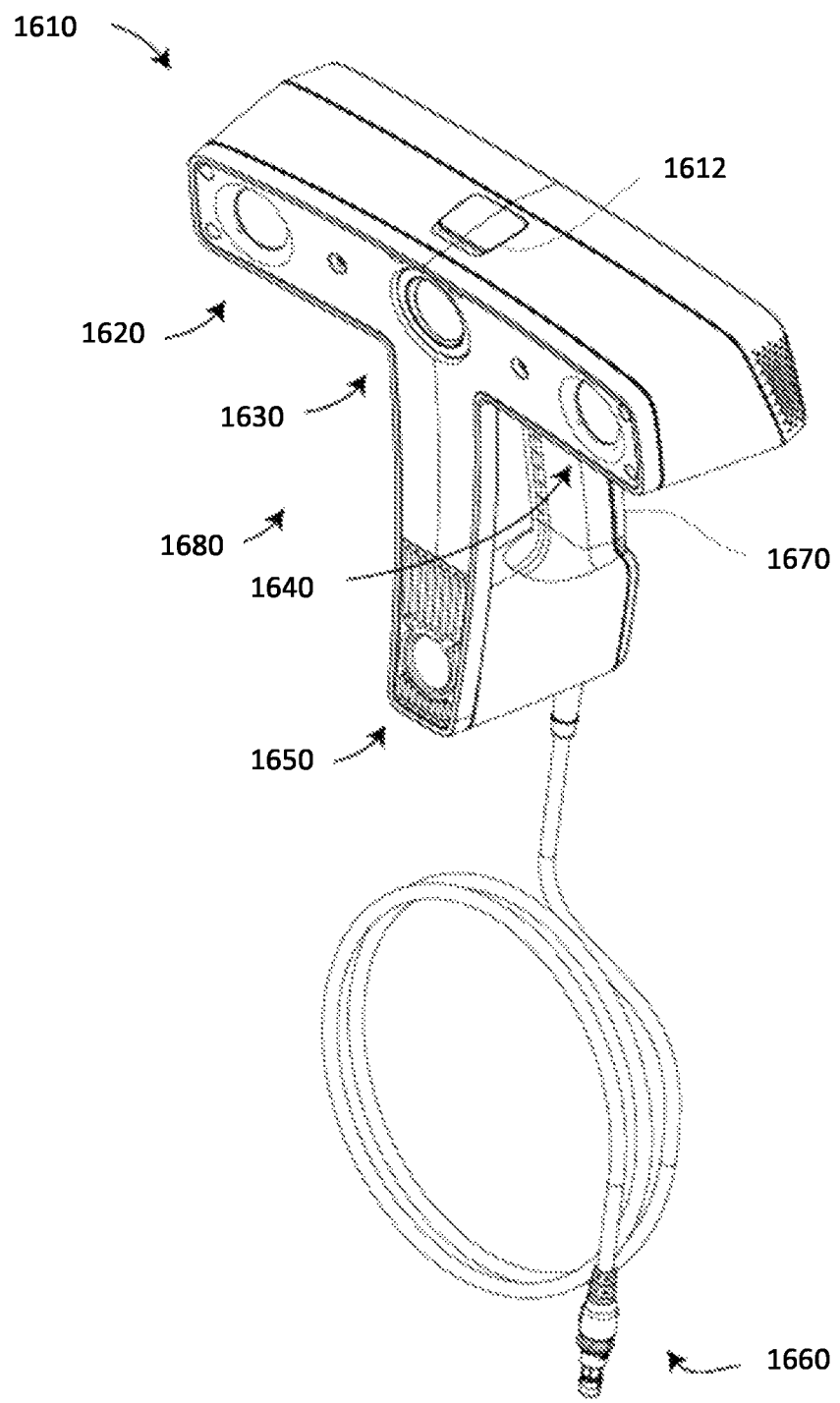
FIGS. 16, 17, 18A, and 18B depict a handheld 3D imager.
Figure 17:
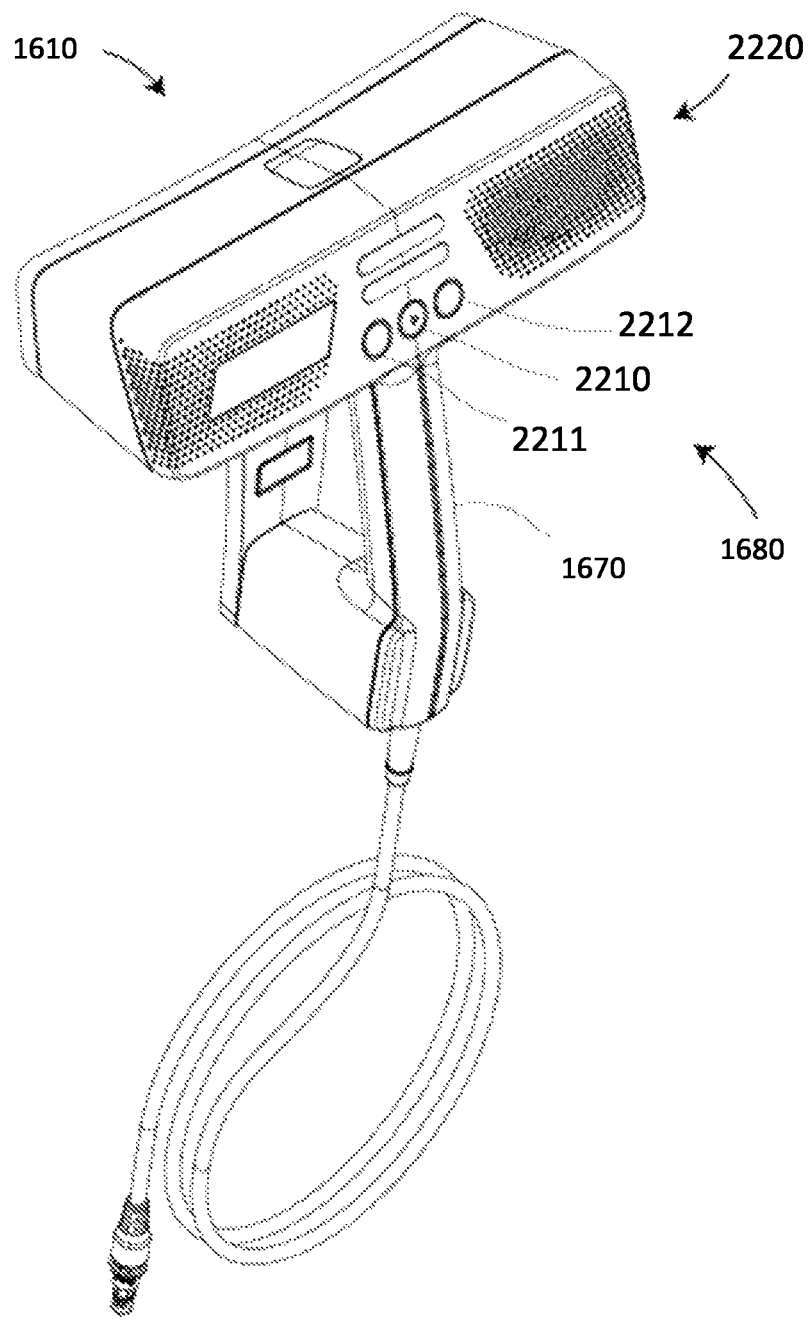

FIGS. 16, 17, 18A, and 18B depict a handheld 3D imager. FIG. 16 is a front isometric view of a handheld 3D triangulation scanner 1610, also referred to as a handheld 3D imager. In an embodiment, the scanner 1610 includes a first infrared (IR) camera 1620, a second IR camera 1640, a registration camera 1630, a projector 1650, an Ethernet cable 1660 and a handle 1670. In an embodiment, the registration camera 1630 is a color camera. Ethernet is a family of computer networking technologies standardized under IEEE 802.3. The enclosure 1680 includes the outmost enclosing elements of the scanner 1610, as explained in more detail herein below. FIG. 17 is a rear perspective view of the scanner 1610 further showing an exemplary perforated rear cover 2220 and a scan start/stop button 2210. In an embodiment, buttons 2211, 2212 may be programmed to perform functions according to the instructions of a computer program, the computer program either stored internally within the scanner 1610 or externally in an external computer. In an embodiment, each of the buttons 2210, 2211, 2212 includes at its periphery a ring illuminated by a light emitting diode (LED).

In an embodiment, the scanner 1610 of FIG. 16 is the scanner described in commonly owned U.S. patent application Ser. No. 16/806,548 filed on Mar. 2, 2020, the contents of which are incorporated by reference herein in its entirety.

Figure 18A:
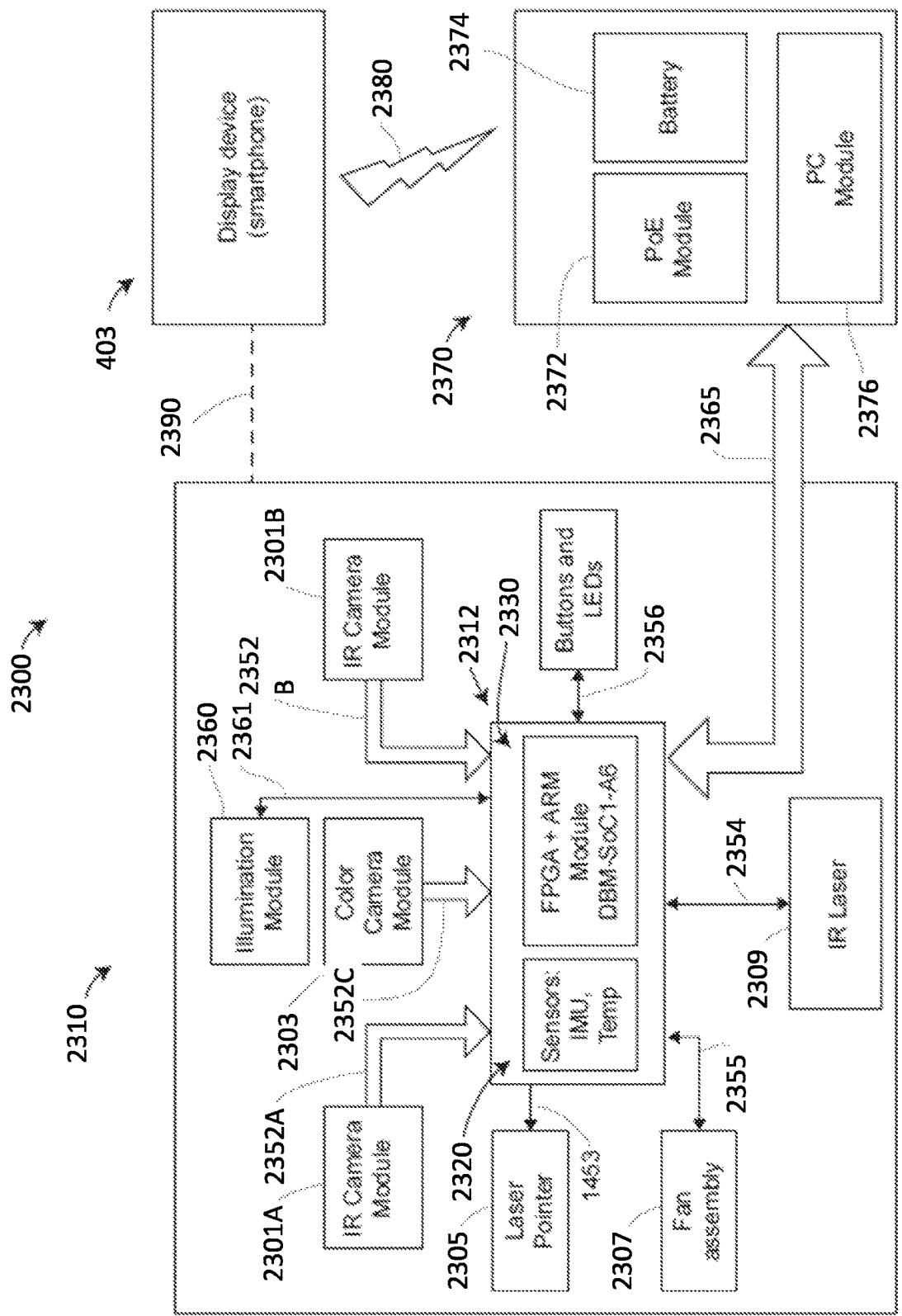
Figure 18B:
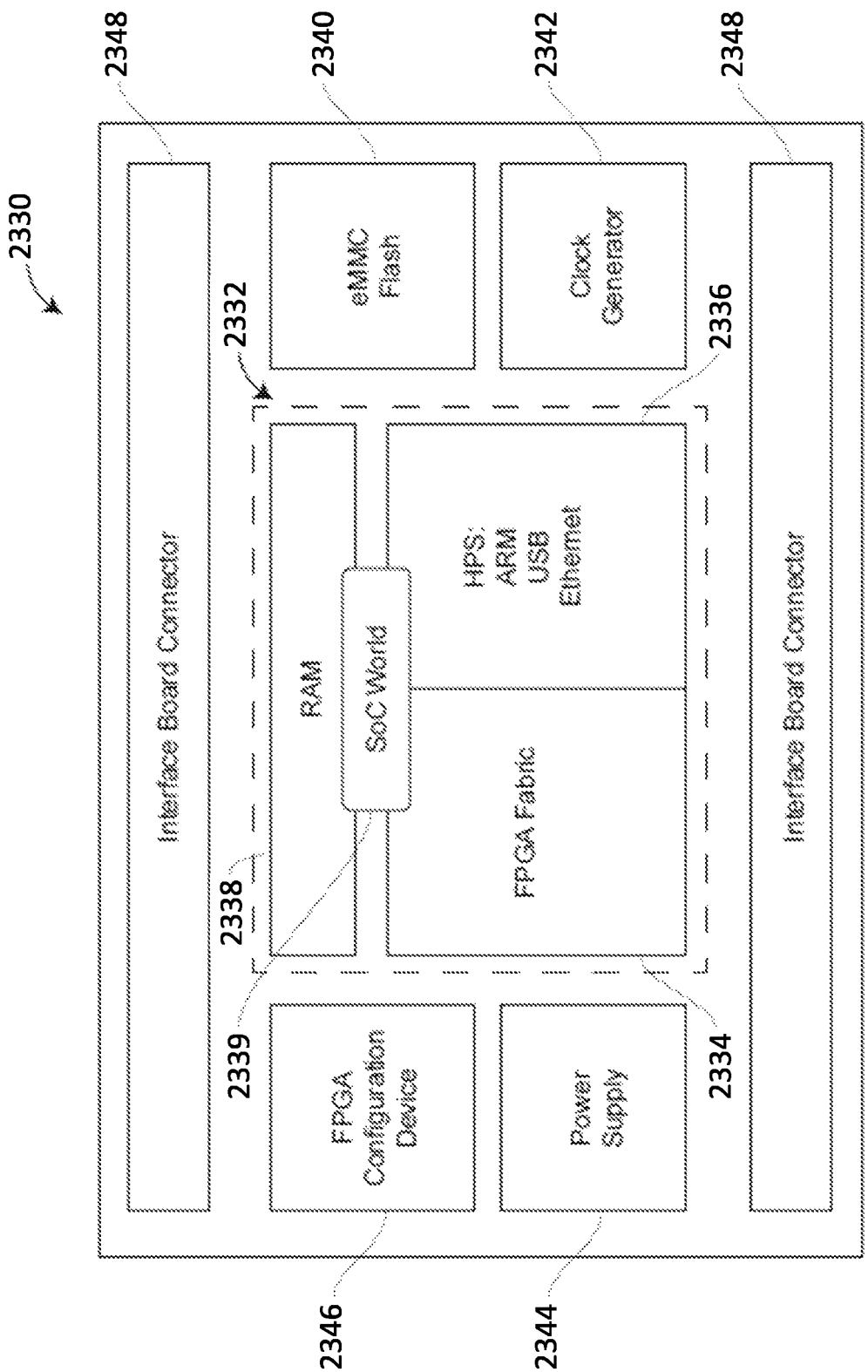

FIG. 18A is a block diagram of system electronics 2300 that in an embodiment is included in the scanner system 10. In an embodiment, the electronics 2300 includes electronics 2310 within the handheld scanner 1610, electronics 2370 within the computing device 110, electronics within the mobile computing device 403, electronics within other electronic devices such as accessories that attach to an accessory interface (not shown), and electronics such as external computers that cooperate with the scanner system electronics 2300. In an embodiment, the electronics 2310 includes a circuit baseboard 2312 that includes a sensor collection 2320 and a computing module 2330, which is further shown in FIG. 18B. In an embodiment, the sensor collection 2320 includes an IMU and one or more temperature sensors. In an embodiment, the computing module 2330 includes a system-on-a-chip (SoC) field programmable gate array (FPGA) 2332. In an embodiment, the SoC FPGA 2332 is a Cyclone V SoC FPGA that includes dual 800 MHz Cortex A9 cores, which are Advanced RISC Machine (ARM) devices. The Cyclone V SoC FPGA is manufactured by Intel Corporation, with headquarters in Santa Clara, Calif. FIG. 18B represents the SoC FPGA 2332 in block diagram form as including FPGA fabric 2334, a Hard Processor System (HPS) 2336, and random access memory (RAM) 2338 tied together in the SoC 2339. In an embodiment, the HPS 2336 provides peripheral functions such as Gigabit Ethernet and USB. In an embodiment, the computing module 2330 further includes an embedded MultiMedia Card (eMMC) 2340 having flash memory, a clock generator 2342, a power supply 2344, an FPGA configuration device 2346, and interface board connectors 2348 for electrical communication with the rest of the system.

Signals from the infrared (IR) cameras 2301A, 2301B and the registration camera 2303 are fed from camera boards through cables to the circuit baseboard 2312. Image signals 2352A, 2352B, 2352C from the cables are processed by the computing module 2330. In an embodiment, the computing module 2330 provides a signal 2353 that initiates emission of light from the laser pointer 2305. A TE control circuit communicates with the TE cooler within the infrared laser 2309 through a bidirectional signal line 2354. In an embodiment, the TE control circuit is included within the SoC FPGA 2332. In another embodiment, the TE control circuit is a separate circuit on the baseboard 2312. A control line 2355 sends a signal to the fan assembly 2307 to set the speed of the fans. In an embodiment, the controlled speed is based at least in part on the temperature as measured by temperature sensors within the sensor unit 2320. In an embodiment, the baseboard 2312 receives and sends signals to buttons 2210, 2211, 2212 and their LEDs through the signal line 2356. In an embodiment, the baseboard 2312 sends over a line 2361 a signal to an illumination module 2360 that causes white light from the LEDs to be turned on or off.

In an embodiment, bidirectional communication between the electronics 2310 and the electronics 2370 is enabled by Ethernet communications link 2365. In an embodiment, the Ethernet link is provided by the cable 1660. In an embodiment, the cable 1660 attaches to the mobile PC 401 through the connector on the bottom of the handle. The Ethernet communications link 2365 is further operable to provide or transfer power to the electronics 2310 through the user of a custom Power over Ethernet (PoE) module 2372 coupled to the battery 2374. In an embodiment, the mobile PC 2370 further includes a PC module 2376, which in an embodiment is an Intel® Next Unit of Computing (NUC) processor. The NUC is manufactured by Intel Corporation, with headquarters in Santa Clara, California. In an embodiment, the mobile PC 2370 is configured to be portable, such as by attaching to a belt and carried around the waist or shoulder of an operator.

It should be appreciated that the examples of measurement devices depicted herein can further be attached an external camera to capture the identity images 310, in addition to any of the cameras that are already associated with the measurement devices.

Terms such as processor, controller, computer, DSP, FPGA are understood in this document to mean a computing device that may be located within an instrument, distributed in multiple elements throughout an instrument, or placed external to an instrument.

Figure 19:
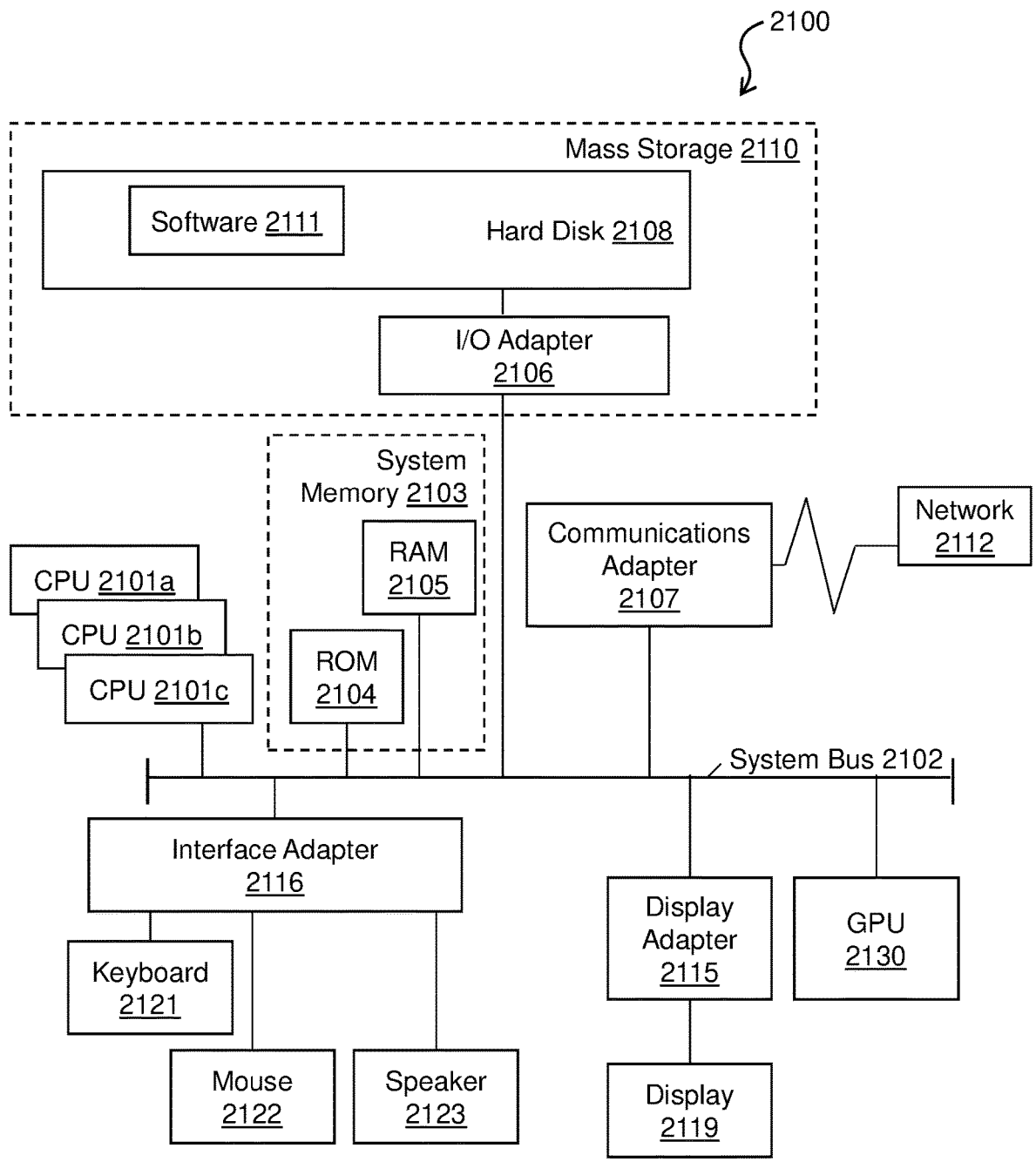
FIG. 19 depicts a computer system according to one or more embodiments.

Turning now to FIG. 19, a computer system 2100 is generally shown in accordance with an embodiment. The computer system 2100 can be used as the computing device 110 and/or the computing device 150. The computer system 2100 can be an electronic, computer framework comprising and/or employing any number and combination of computing devices and networks utilizing various communication technologies, as described herein. The computer system 2100 can be easily scalable, extensible, and modular, with the ability to change to different services or reconfigure some features independently of others. The computer system 2100 may be, for example, a server, desktop computer, laptop computer, tablet computer, or smartphone. In some examples, computer system 2100 may be a cloud computing node. Computer system 2100 may be described in the general context of computer system executable instructions, such as program modules, being executed by a computer system. Generally, program modules may include routines, programs, objects, components, logic, data structures, and so on that perform particular tasks or implement particular abstract data types. Computer system 2100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 19, the computer system 2100 has one or more central processing units (CPU(s)) 2101a, 2101b, 2101c, etc. (collectively or generically referred to as processor(s) 2101). The processors 2101 can be a single-core processor, multi-core processor, computing cluster, or any number of other configurations. The processors 2101, also referred to as processing circuits, are coupled via a system bus 2102 to a system memory 2103 and various other components. The system memory 2103 can include a read only memory (ROM) 2104 and a random access memory (RAM) 2105. The ROM 2104 is coupled to the system bus 2102 and may include a basic input/output system (BIOS), which controls certain basic functions of the computer system 2100. The RAM is read-write memory coupled to the system bus 2102 for use by the processors 2101. The system memory 2103 provides temporary memory space for operations of said instructions during operation. The system memory 2103 can include random access memory (RAM), read only memory, flash memory, or any other suitable memory systems.

The computer system 2100 comprises a graphics processing unit (GPU) 2130 that can include one or more processing cores and memory devices. The GPU can be used as a co-processor by the processors 2101 to perform one or more operations described herein.

The computer system 2100 comprises an input/output (I/O) adapter 2106 and a communications adapter 2107 coupled to the system bus 2102. The I/O adapter 2106 may be a small computer system interface (SCSI) adapter that communicates with a hard disk 2108 and/or any other similar component. The I/O adapter 2106 and the hard disk 2108 are collectively referred to herein as a mass storage 2110.

Software 2111 for execution on the computer system 2100 may be stored in the mass storage 2110. The mass storage 2110 is an example of a tangible storage medium readable by the processors 2101, where the software 2111 is stored as instructions for execution by the processors 2101 to cause the computer system 2100 to operate, such as is described herein below with respect to the various Figures. Examples of computer program product and the execution of such instruction is discussed herein in more detail. The communications adapter 2107 interconnects the system bus 2102 with a network 2112, which may be an outside network, enabling the computer system 2100 to communicate with other such systems. In one embodiment, a portion of the system memory 2103 and the mass storage 2110 collectively store an operating system, which may be any appropriate operating system to coordinate the functions of the various components shown in FIG. 19.

Additional input/output devices are shown as connected to the system bus 2102 via a display adapter 2115 and an interface adapter 2116 and. In one embodiment, the adapters 2106, 2107, 2115, and 2116 may be connected to one or more I/O buses that are connected to the system bus 2102 via an intermediate bus bridge (not shown). A display 2119 (e.g., a screen or a display monitor) is connected to the system bus 2102 by a display adapter 2115, which may include a graphics controller to improve the performance of graphics intensive applications and a video controller. A keyboard 2121, a mouse 2122, a speaker 2123, etc. can be interconnected to the system bus 2102 via the interface adapter 2116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 19, the computer system 2100 includes processing capability in the form of the processors 2101, and, storage capability including the system memory 2103 and the mass storage 2110, input means such as the keyboard 2121 and the mouse 2122, and output capability including the speaker 2123 and the display 2119.

In some embodiments, the communications adapter 2107 can transmit data using any suitable interface or protocol, such as the internet small computer system interface, among others. The network 2112 may be a cellular network, a radio network, a wide area network (WAN), a local area network (LAN), or the Internet, among others. An external computing device may connect to the computer system 2100 through the network 2112. In some examples, an external computing device may be an external webserver or a cloud computing node.

It is to be understood that the block diagram of FIG. 19 is not intended to indicate that the computer system 2100 is to include all of the components shown in FIG. 19. Rather, the computer system 2100 can include any appropriate fewer or additional components not illustrated in FIG. 19 (e.g., additional memory components, embedded controllers, modules, additional network interfaces, etc.). Further, the embodiments described herein with respect to computer system 2100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It should be noted that embodiments of the technical solutions described herein address technical challenges with a coordinate measurement device such as a laser tracker, a scanner, etc., and particularly a coordinate measurement device that communicates with a computing system in real-time to transfer commands and/or data, and wherein a user interface that identifies and facilitates addressing a communication failure between the coordinate measurement device and the computing system is not physically accessible by an operator of the coordinate measurement device. Embodiments described herein detect such a communication failure, which is referred to as a "glitch" and facilitate re-establishing the connection without any operator interaction. It should be noted that although communication failures are more common with wireless connections, wired connections can also experience such communication failures. Embodiments of the technical solutions described herein address the communication failures in case of both wireless, and wired connections.

It will be appreciated that aspects of the present disclosure may be embodied as a system, method, or computer program product and may take the form of a hardware embodiment, a software embodiment (including firmware, resident software, micro-code, etc.), or a combination thereof. Furthermore, aspects of the present disclosure may take the form of a computer program product embodied in one or more computer-readable medium(s) having computer-readable program code embodied thereon.

One or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer-readable storage medium may be a tangible medium containing or storing a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium, and that can communicate, propagate, or transport a program for use by or in connection with an instruction execution system, apparatus, or device.

The computer-readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present disclosure are described herein with reference to flowchart illustrations and/or block diagrams of methods, apparatus (systems) and computer program products according to embodiments. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

What is claimed is:

1. A system comprising:
one or more processors that automatically register a plurality of captured data, each of the plurality of captured data being captured separately, wherein a method for the registering comprises:
accessing a first captured data of said plurality of captured data of a portion of an environment, the first captured data acquired by a scanner having two cameras, and a first image of the environment corresponding to the first captured data, the first image being of said portion of the environment captured from a known relative position and angle with respect to the first captured data;
generating a first fingerprint data based on the first image, the first fingerprint being one of a vectorized data of the first image, a hash value of the first image, and a reduced dimensionality image of the first image;
extracting a set of features from the first image;
generating a second finger print data based on a second image associated with a second captured data, the second fingerprint being one of a vectorized data of the second image, a hash value of the second image, and a reduced dimensionality image of the second image;
identifying, from the plurality of captured data, the second captured data that has at least a partial overlap with said portion of the environment based on a match between the first fingerprint data and the second fingerprint data exceeding a predetermined level, the second captured data being identified based on a corresponding second image of the environment that includes a subset of features from the set of features that is extracted from the first image, the second image being captured from a known relative position and angle with respect to the second captured data;

measuring a pose and angle of the first image with respect to the second image based on movement data acquired by the scanner, and aligning the first image to the second image by using the subset of features that are in both, the first image and the second image;

transforming the second captured data and/or the first captured data to a coordinate system based on the measured pose and angle and relative positions and angles of the first image and the second image and the first captured data and the second captured data, respectively.

2. The system of claim 1, wherein the first image is captured at the time the first captured data is obtained.

3. The system of claim 2, wherein the first captured data and the second captured data are obtained at different times.

4. The system of claim 1, wherein the first captured data and the second captured data are captured using different types of measurement devices.

5. The system of claim 4, wherein the first image and the second image are captured using different image capturing devices.

6. The system of claim 1, wherein the first captured data comprises a 3D point cloud of said portion, and the second captured data comprises a 2D scan of said portion.

7. The system of claim 1, wherein the set of features comprises one or more natural features that are detected in said portion.

8. The system of claim 1, wherein the set of features comprises one or more artificial markers that are detected in said portion.

9. The system of claim 1, wherein the first image and the second image are each captured using a respective wide-angle lens.

10. The system of claim 1, wherein the coordinate system is a first coordinate system of the first captured data.

11. The system of claim 1, wherein the plurality of captured data is stored in a database.

12. The system of claim 1, wherein the pose and angle of the second captured data is determined further based on one or more sensor measurements associated with a measurement device that is used to capture the second captured data.

13. A computer-implemented method performed by one or more processors to automatically register a plurality of captured data obtained using a respective measurement device, each of the captured data is obtained separately, wherein the computer-implemented method comprises:

accessing a first captured data of a portion of an environment, the first captured data acquired by a scanner having two cameras, and a first image of the environment corresponding to the first captured data, the first image being said portion of the environment captured from the same position as the first captured data;

generating a first fingerprint data based on the first image, the first fingerprint being one of a vectorized data of the first image, a hash value of the first image, and a reduced dimensionality image of the first image;

extracting a set of features from the first image;

generating a second finger print data based on a second image associated with a second captured data, the second fingerprint being one of a vectorized data of the second image, a hash value of the second image, and a reduced dimensionality image of the second image;

identifying, from the plurality of captured data, the second captured data that has at least a partial overlap with said portion based on a match between the first fingerprint data and the second fingerprint data exceeding a predetermined level, the second captured data being identified based on a corresponding second image of the environment including a subset of features from the set of features being extracted from the first image, the second image being captured from the same position as the second captured data;

measuring a pose and angle of the first image with respect to the second image based on movement data acquired by the scanner, and aligning the first image to the second image by using the subset of features that are in both, the first image and the second image;

transforming the second captured data and/or the first captured data to a coordinate system based on the measured pose and angle and relative positions and angles of the first image and the second image and the first captured data and the second captured data, respectively.

14. The method of claim 13, wherein the first image is captured at the time the first captured data is obtained.

15. The method of claim 14, wherein the first captured data and the second captured data are obtained at different times.

16. The method of claim 13, wherein the first captured data and the second captured data are captured using different measurement devices.

17. The method of claim 16, wherein the first image and the second image are captured using different image capturing devices.

18. The method of claim 13, wherein the first captured data comprises a 3D point cloud of said portion, and the second captured data comprises a 2D scan of said portion.

19. The method of claim 13, wherein the plurality of captured data is stored in a database.

20. The method of claim 13, wherein the pose of the second captured data is determined further based on one or more sensor measurements associated with a measurement device that is used to capture the second captured data.

* * * * *